US011518899B2

(12) United States Patent
Boone et al.

(10) Patent No.: US 11,518,899 B2
(45) Date of Patent: Dec. 6, 2022

(54) AROMATIC ENOL ETHER PAINT ADDITIVES

(71) Applicant: Eastman Chemical Company, Kingsport, TN (US)

(72) Inventors: Matthew Allen Boone, Kingsport, TN (US); Dustin John Czirr, Johnson City, TN (US)

(73) Assignee: Eastman Chemical Company, Kingsport, TN (US)

( * ) Notice: Subject to any disclaimer, the term of this patent is extended or adjusted under 35 U.S.C. 154(b) by 619 days.

(21) Appl. No.: 16/559,859

(22) Filed: Sep. 4, 2019

(65) Prior Publication Data

US 2021/0062031 A1 Mar. 4, 2021

(51) Int. Cl.
*C09D 113/02* (2006.01)
*C09D 7/63* (2018.01)
*C09D 109/08* (2006.01)

(52) U.S. Cl.
CPC .............. *C09D 113/02* (2013.01); *C09D 7/63* (2018.01); *C09D 109/08* (2013.01)

(58) Field of Classification Search
CPC ....... C09D 113/02; C09D 7/63; C09D 109/08
USPC .................................................. 106/287.26
See application file for complete search history.

(56) References Cited

U.S. PATENT DOCUMENTS

| | | | |
|---|---|---|---|
| 2,578,724 A | 12/1951 | Mertzweiller | |
| 4,248,957 A | 2/1981 | Sander et al. | |
| 4,839,413 A | 6/1989 | Kiehlbauch et al. | |
| 4,927,876 A | 5/1990 | Coogan et al. | |
| 4,939,233 A | 7/1990 | Jenkins et al. | |
| 4,946,932 A | 8/1990 | Jenkins | |
| 5,053,556 A | 10/1991 | Ohnishi | |
| 5,137,961 A | 8/1992 | Goos et al. | |
| 5,247,040 A | 9/1993 | Amick et al. | |
| 5,296,530 A | 3/1994 | Bors et al. | |
| 5,484,849 A | 1/1996 | Bors et al. | |
| 6,451,380 B1 | 9/2002 | Speece, Jr. et al. | |
| 6,743,748 B2 | 6/2004 | Mizuno et al. | |
| 7,208,545 B1 | 4/2007 | Brunner et al. | |
| 9,932,486 B1 * | 4/2018 | Cogar | C08L 31/00 |
| 10,889,536 B1 | 1/2021 | Boone et al. | |
| 11,312,873 B2 | 4/2022 | Boone et al. | |
| 2003/0232951 A1 | 12/2003 | Friedrich | |
| 2006/0089415 A1 | 4/2006 | Monte et al. | |
| 2009/0035696 A1 | 2/2009 | Matsuoka | |
| 2009/0076311 A1 | 3/2009 | Sato et al. | |
| 2012/0157609 A1 | 6/2012 | Maddox et al. | |
| 2012/0157614 A1 | 6/2012 | Maddox et al. | |
| 2012/0289721 A1 | 11/2012 | End et al. | |
| 2015/0239816 A1 | 8/2015 | Zaragoza Doerwald et al. | |

FOREIGN PATENT DOCUMENTS

| | | |
|---|---|---|
| EP | 0 381 481 A1 | 8/1990 |
| EP | 0 492 847 A2 | 7/1992 |
| EP | 2 050 784 A1 | 4/2009 |
| EP | 3 415 571 A1 | 12/2018 |
| JP | S60 178840 A | 9/1985 |
| JP | S63 10153 A | 1/1988 |
| JP | H02 1868 A | 1/1990 |
| JP | 3 449818 B2 | 9/2003 |
| JP | 2003/327855 A | 11/2003 |
| JP | 2010/248360 A | 11/2010 |
| WO | WO 2007/094922 A1 | 8/2007 |
| WO | WO 2011/042652 A1 | 4/2011 |
| WO | WO 2017/137734 A1 | 8/2017 |
| WO | WO 2017/176504 A1 | 12/2017 |
| WO | WO 2019/069210 A1 | 4/2019 |

OTHER PUBLICATIONS

Co-pending U.S. Appl. No. 16/559,842, filed Sep. 4, 2019; Boone.
Co-pending U.S. Appl. No. 16/559,871, filed Sep. 4, 2019; Boone.
Co-pending U.S. Appl. No. 16/559,887, filed Sep. 4, 2019; Boone.
Co-pending U.S. Appl. No. 16/559,912, filed Sep. 4, 2019; Boone.
Co-pending U.S. Appl. No. 16/559,897, filed Sep. 4, 2019; Boone.
Co-pending U.S. Appl. No. 16/559,880, filed Sep. 4, 2019; Boone et al.
Co-pending U.S. Appl. No. 16/560,146, filed Sep. 4, 2019; Boone et al.
Co-pending U.S. Appl. No. 16/560,161, filed Sep. 4, 2019; Boone et al.
Co-pending U.S. Appl. No. 16/559,977, filed Sep. 4, 2019; Boone.
Co-pending U.S. Appl. No. 16/559,988, filed Sep. 4, 2019; Boone et al.
ASTM D1544; Standard Test Method for Color of Transparent Liquids (Gardner Color Scale).
ASTM D2354-10$^{e1}$; Standard Test Method for Minimum Film Formation Temperature (MFFT) of Emulsion Vehicles.
ASTM D4946; Standard Test Method for Blocking Resistance of Architectural Paints.
ASTM D6886; Standard Test Method for Determination of the Weight Percent Individual Volatile Organic Compounds in Waterborne Air-Dry Coatings by Gas Chromatography.
Burczyk, B. et al.; "Relations between chemical structure and surface activity I: Synthesis and properties of aqueous solutions of acetals formed from aliphatic aldehydes and monoalkyl ethers of ethylene glycols;" Tenside Detergents; 15(2); 1978; pp. 68-71.
Burczyk, B. et al.; "Surface Properties of Selected Linear and Cyclic Acetals;" Tensioactivos: Biodegradabilidad, Fis.-Quim. Apl., Jorn. Com. Esp. Deterg.; 11$^{th}$; 1980; pp. 581-601.
Cohen, R. et al.; "Foam stabilizing properties of linear acetals containing oxyethylene units in their molecules;" Tenside Detergents; 18 (4); 1981; pp. 202-205.

(Continued)

*Primary Examiner* — Hui H Chin
(74) *Attorney, Agent, or Firm* — C. Stuart Everett

(57) ABSTRACT

Disclosed are aromatic enol ethers that have utility as film-hardening additives for coating formulations. The aromatic enol ethers have particular utility as film-hardening additives for water-based coating formulations. The aromatic enol ethers provide improvements in hardness and hardness related properties such as block resistance without contributing to the volatile organic content of the composition.

20 Claims, No Drawings

(56) References Cited

OTHER PUBLICATIONS

Duchene, A. et al.; "Alxoxyméthyltributylétains précurseurs d'alcoxyméthyllithiums : application à la synthèse de monoéthers d'α-glycols et à l'homologation de cétones en aldéhydes;" Bulletin De La Societe Chimique De France; 1985; No. 5; pp. 787-792.

Getzkin, AJ. et al.; "Synthesis of Some Symmetrical Aldehyde Glycol Monoether Acetals;" Journal of the American Pharmaceutical Association, Scientific Edition; 49; 1960; pp. 746-750.

Kanno, T. et al.; "Oxygenation of Aromatic Vinyl Ethers. A Noticeable Formation of Epoxides and Reaction Mechanism;" Bull. Chem. Soc. Jpn.; 54; 1981; pp. 2330-2336.

Moszner, N. et al.; "Reaction behavior of monomeric β-ketoesters. 2. Synthesis, characterization and polymerization of methacrylate group containing enamines;" Polymer Bulletin; 32; pp. 419-426; (1994).

Presidential Green Chemistry Challenge: 2005 Designing Greener Chemical Award; Archer Daniels Midland Company; Archer RC™: A Nonvolatile, Reactive Coalescent for the Reduction of VOCs in Latex Paints; United States Environmental Protection Agency; Accessed via the web on Jun. 6, 2018; https://www.epa.gov/greenchemistry/presidential-green-chemistry-challenge-2005-designing-greener-chemicals-award.

Robinson, M. et al.; "Epoxide ring-opening and Meinwald rearrangement reactions of epoxides catalyzed by mesoporous aluminosilicates;" Organic & Biomolecular Chemistry; 2009; 7; pp. 2559-2564.

Safa, K. et al.; "1,4-bis[2,2-bis(trimethylsilyl)ethenyl]benzene: Regioselective ring opening of its a,B-eposybix(silane) with some nucleophiles;" Journal of Organometallic Chemistry; 694; 20019; pp. 1907-1911.

Smith, O.W. et al.; "New vinyl ester monomers for emulsion polymers;" Progress in Organic Coatings; 22; 1993; pp. 19-25.

Sokolowski, A. et al.; "Acetals and Ethers. Part IV*. Synthesis of Acetals from Aliphatic Aldehydes and Monoalkyl Ether of Ethylene Glycols;" Polish Journal of Chemistry (formerly Roczniki Chemii); 53(4); 1979; pp. 905-912.

Sokolowski, A. et al.; "Statistical Evaluation of the Influence of Linear Acetal Structures on Their Adsorption at the Aqueous Solution-Air Interface;" Comunicaciones presentadas a las XII Jornadas del Comite Espanol de la Detergencia; Asociacion De Investigacion De Detergentes, Tens; 1981; pp. 491-507.

USPTO Office Action dated Apr. 30, 2020 received in co-pending U.S. Appl. No. 16/560,161.

Trost et al.; "Model for Asymmetric Induction in the Diels-Alder Reaction;" Journal of the American Chemical Society; vol. 102; 1980; pp. 7595-7596.

USPTO Office Action dated Apr. 6, 2020 received in co-pending U.S. Appl. No. 16/559,842.

USPTO Notice of Allowance dated Nov. 1, 2019 received in co-pending U.S. Appl. No. 16/559,977.

USPTO Notice of Allowance dated Dec. 10, 2019 received in co-pending U.S. Appl. No. 16/559,977.

USPTO Notice of Allowance dated Nov. 1, 2019 received in co-pending U.S. Appl. No. 16/559,988.

USPTO Notice of Allowance dated Dec. 11, 2019 received in co-pending U.S. Appl. No. 16/559,988.

Kluge et al.; "Phosphonate Reagents for the Synthesis of Enol Ethers and One-Carbon Homologation to Aldehydes;" J. Org. Chem.; vol. 44; No. 26; 1979; pp. 4847-4852.

USPTO Notice of Allowance dated Aug. 10, 2020 received in co-pending U.S. Appl. No. 16/559,842.

USPTO Office Action dated Jun. 10, 2020 received in co-pending U.S. Appl. No. 16/559,871.

USPTO Notice of Allowance dated Sep. 30, 2020 received in co-pending U.S. Appl. No. 16/559,871.

USPTO Notice of Allowance dated Jun. 24, 2020 received in co-pending U.S. Appl. No. 16/559,887.

USPTO Office Action dated Jun. 10, 2020 received in co-pending U.S. Appl. No. 16/559,912.

USPTO Notice of Allowance dated Sep. 16, 2020, received in co-pending U.S. Appl. No. 16/559,912.

USPTO Office Action dated Jun. 1, 2020 received in co-pending U.S. Appl. No. 16/559,897.

USPTO Office Action dated Dec. 2, 2020 received in co-pending U.S. Appl. No. 16/559,880.

USPTO Notice of Allowance dated Jun. 14, 2021 received in co-pending U.S. Appl. No. 16/559,880.

USPTO Notice of Allowance dated Dec. 3, 2021 received in co-pending U.S. Appl. No. 16/559,880.

USPTO Notice of Allowance dated Aug. 17, 2020 received in co-pending U.S. Appl. No. 16/560,161.

Carl Magnus Anderson et al: "Chelation-controlled, palladium-catalyzed vinylic substitution reactions of vinyl ethers. 2-Arylethanal equivalents from aryl halides", Journal of organic chemistry, Oct. 1, 1990, pp. 5757-5761; URL: https://pubs.acs.org/doi/pdf/10.1021/jo00309a020.

Cornelis M. Moorhoff et al.; "Synthesis of Symmetrical, Substituted (alkane-[alpha], [omega]-diyl)(bis[3,3'-allyl dithoioethers]) Monomers for Photoplastic Polymer Networks", Australian Journal of Chemistry, vol. 65, No. 8, Jan. 1, 2012 (Jan. 1, 2012), p. 1165, XP055755412, AU ISSN: 0004-9425, DOI: 10.1071/CH12278.

Ghasemi et al. Annali di Chimica (Rome, Italy) (Year 2007), 97(1-2), 69-83.

Kuz'mina N A et al: "[Chemical transformations of 1, 1-dcholoro-2,2-diarylethanes]", Ivestiya Akademii Nauk SSSR, Seriya Khimicheskaya, Institut Organicheskoi Khimii Im. N. D. Zelinskogo Rossiiskoi Akademii, RU, vol. 6, No. Jan. 1, 1986; pp. 1443-1446, ISSN: 0002-3353 table 1.

Lapienes Grzegorz et al.; "Star Polymers formed by MPEG reaction with diepoxides. The course of reaction", Polymer, vol. 72, pp. 142-153, XP029259059, issn: 0032-3861, DOI: 10.1016/J.POLYMER.2015.07.004.

Trinchillo et al. Organometallics (Year 2016), 35(5), 641-654.

Yoshida H et al.; "Synthesis of macrocyclic 1, 1'-biarenol derivatives by the tandem Claisen rearrangement and their binding properties", Tetrahedron Letters, Elsevier, Amsterdam, NL, vol. 46, No. 22, May 30, 2005 (May 30, 2005), pp. 3901-3904, XP025386264.

Notification of Transmittal of the International Search Report and the Written Opinion of the International Searching Authority, or the Declaration dated Nov. 18, 2020 received in International Application No. PCT/US2020/048867.

Notification of Transmittal of the International Search Report and the Written Opinion of the International Searching Authority, or the Declaration dated Nov. 18, 2020 received in International Application No. PCT/US2020/048927.

Notification of Transmittal of the International Search Report and the Written Opinion of the International Searching Authority, or the Declaration dated Dec. 10, 2020 received in International Application No. PCT/US2020/048866.

Notification of Transmittal of the International Search Report and the Written Opinion of the International Searching Authority, or the Declaration dated Dec. 15, 2020 received in International Application No. PCT/US2020/048860.

Notification of Transmittal of the International Search Report and the Written Opinion of the International Searching Authority, or the Declaration dated Dec. 10, 2020 received in International Application No. PCT/US2020/048912.

Notification of Transmittal of the International Search Report and the Written Opinion of the International Searching Authority, or the Declaration dated Dec. 15, 2020 received in International Application No. PCT/US2020/048861.

Notification of Transmittal of the International Search Report and the Written Opinion of the International Searching Authority, or the Declaration dated Dec. 10, 2020 received in International Application No. PCT/US2020/048862.

Notification of Transmittal of the International Search Report and the Written Opinion of the International Searching Authority, or the Declaration dated Dec. 10, 2020 received in International Application No. PCT/US2020/048915.

(56) References Cited

OTHER PUBLICATIONS

Notification of Transmittal of the International Search Report and the Written Opinion of the International Searching Authority, or the Declaration dated Dec. 10, 2020 received in International Application No. PCT/US2020/048918.
Notification of Transmittal of the International Search Report and the Written Opinion of the International Searching Authority, or the Declaration dated Dec. 10, 2020 received in International Application No. PCT/US2020/048926.
Suda et al.; "Metalloporphyrin-catalyzed regioselective rearrangement of monoalkyl-substituted expoxides into aldehydes;" Tetrahedron Letters; vol. 40; No. 40; 1999; pp. 7243-7246.
Yanagisawa et al.; "Selective Isomerization of 1,2-epoxyalkanes to aldehydes with lithium dialkylamides;" Journal of the Chemical Society, Chemical Communications, Royal Society of Chemistry; 1994; Issue 18; pp. 2103-2104.
Zaccheria et al.; "Mono and Bifunctional Catalysts for Styrene Oxide Isomerization of Hydrogenation;" Catalysis Letters; Kluwer Academic Publishers-Plenum Publishers; vol. 141; No. 4; 2011; pp. 587-591.

\* cited by examiner

AROMATIC ENOL ETHER PAINT ADDITIVES

FIELD OF THE INVENTION

This application relates to chemistry generally. In particular, this application relates to enol ethers and more particularly to aromatic enol ethers. More particularly, this invention relates to aromatic enol ethers and their use as additives for paints and coatings.

BACKGROUND OF THE INVENTION

Typical waterborne paints consist of a latex polymer in water emulsion and additives to enhance properties such as film formation, freeze-thaw resistance, application ease, rheological properties, and pigments to provide opacity and color. Historically in such paints, the polymer had a relatively high glass-transition temperature (Tg), often in the range of 20° C. or higher. Many of the additives selected were volatile and therefore evaporated out of the film during the drying process. When the water and additives evaporated, the resulting paint film exhibited properties such as weatherability, block and print resistance, scrub resistance, dirt pick up resistance and the like, due in part to the high Tg of the latex polymer remaining in the film.

Due to regulatory restrictions limiting the amount of volatile organic materials used in paints and coatings, paint companies have been forced to modify their formulations. Many have adopted the use of softer latexes with Tg in the range of 5° C. to below 0° C. that will more readily form a film. In addition, many have also begun to use non-volatile additives which remain in the film after drying. Both approaches have yielded resulting paint films that are softer than desired for good performance. These softer coatings can have various undesirable performance characteristics such as reduced block and print resistance, poor scrub resistance, increased dirt pick up, and the like.

Attempts have been made in the past to introduce additives, often promoted as "reactive coalescents" which could increase the hardness of paint films. For example, some were based on polyunsaturated fatty acid derivatives which in theory could auto-crosslink in the presence of oxygen. Potential shortcomings for these types of materials include slow hardness development due to the minimal crosslinking at low levels of incorporation, the potential for color development, and the fact that driers may be required to promote cross-linking.

Reactive diluents may also be used to create crosslinks in a latex film. They are typically part of a two-component system; the reactive diluent contains reactive groups which react with pendant-functional groups on the latex polymer backbone such as a carbonate, epoxide, isocyanate, isopropenyl, carboxylic acid, allyl groups, acetoacetoxy or amine groups. However, these reactive systems may yellow over time, compromising coating appearance. Some reactive systems require a trigger such as UV light exposure or heat for effective crosslinking that is impractical for the consumer to implement. Furthermore, it is difficult to formulate a two-component reactive system into a single formulation and maintain the shelf-stability of the formulation prior to application.

There is a need for paint additives that react during the paint film formation process, yield films having better block or print resistance, scrub resistance, weatherability and/or solvent resistance as compared to films obtained from paint compositions without such additives, and do not contribute to the VOC of the paint formula. In particular, a need exists for waterborne coating compositions which may be formulated as a single, shelf-stable, self-curing composition which produces desirable properties in the resulting cured coating.

Other beneficial features of a good reactive film-hardening aid include low water solubility, ease of addition to paint formulations, compatibility with multiple formulations, high coalescing efficiency, low freezing point, low foaming and good hydrolytic stability. A desirable reactive film-hardening aid will be compatible with most latex polymers, is easily added to formulations, has low volatility and odor, and provides good color development properties.

SUMMARY OF THE INVENTION

The Invention is set forth in the appended claims.
There is now provided a coating composition comprising:
a. at least one latex compound; and
b. at least one aromatic enol ether having Formula I:

wherein:
A is

wherein ** indicates the point of attachment; and
$R^{1a}$ is

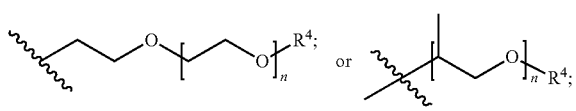

each $R^2$ is independently $(C_{5-10})$aryl;
each $R^3$ is independently $(C_{1-10})$alkyl or $(C_{5-10})$aryl;
$R^4$ is hydrogen, $(C_{1-12})$alkyl, $(C_{2-12})$alkenyl, or $—C(O)R^5$;
$R^5$ is $(C_{1-12})$ alkyl unsubstituted or substituted by $R^6$, $(C_{2-12})$ alkenyl unsubstituted or substituted by $R^6$, $(C_{3-8})$ cycloalkyl, or 5- to 9-membered aryl;
$R^6$ is $(C_{1-4})$alkoxy, or oxo; and
n is an integer from 1 to 15.

There is now also provided a coating composition comprising:
a. at least one latex compound;
b. at least one aromatic enol ether having Formula II

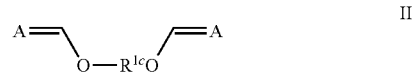

wherein:
each A is independently

wherein ** indicates the point of attachment, and; $R^{1c}$ is

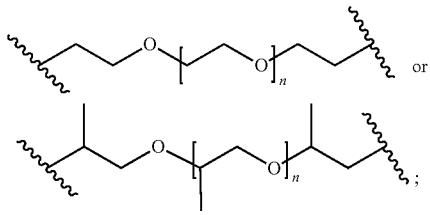

each $R^2$ is independently $(C_{5-10})$aryl;
each $R^3$ is independently $(C_{1-10})$alkyl or $(C_{5-10})$aryl; and n is an integer from 1 to 15.

The aromatic enol ethers of Formulas I and II have particular utility as film-hardening additives for water-based coating formulations. Such additives may also assist with enhancing the film formation (coalescing) process.

DETAILED DESCRIPTION

Definitions

In this specification and in the claims that follow, reference will be made to a number of terms, which shall be defined to have the following meanings.

"Alkyl" means an aliphatic hydrocarbon. The alkyl can specify the number of carbon atoms, for example $(C_{1-5})$ alkyl. Unless otherwise specified, the alkyl group can be unbranched or branched. In some embodiments, the alkyl group is branched. In some embodiments, the alkyl group is unbranched. Non-limiting examples of alkanes include methane, ethane, propane, isopropyl (i.e., branched propyl), butyl, and the like.

"Alkenyl" means an aliphatic hydrocarbon with one or more unsaturated carbon-carbon bonds. The alkenyl can specify the number of carbon atoms, for example $(C_{2-12})$ alkenyl. Unless otherwise specified, the alkyl group can be unbranched or branched. In some embodiments, the alkyl group is branched. In some embodiments, the alkyl group is unbranched. Non-limiting examples of alkanes include ethenyl, propenyl, butenyl, hexa-3,5-dienyl, and the like.

"Alcohol" means a chemical containing one or more hydroxyl groups.

"Aldehyde" means a chemical containing one or more —C(O)H groups.

"Cycloalkyl" means a cyclic hydrocarbon compound. The cycloalkyl can specify the number of carbon atoms in ring system, for example $(C_{3-8})$cycloalkyl. Non-limiting examples of cycloalkyl include cyclopropyl, cyclobutyl, cyclohexyl, and cyclooctyl.

"Aryl" means a ring system made up carbon atoms that has at least one ring that is aromatic. The carbon units making up the aryl ring may be specified, for example 5- to 9-membered aryl. Non-limiting examples of aryl include phenyl, naphthyl, 2,3-dihydro-1H-indene, and 1,2,3,4-tetrahydronaphthalene.

Values may be expressed as "about" or "approximately" a given number. Similarly, ranges may be expressed herein as from "about" one particular value and/or to "about" or another particular value. When such a range is expressed, another aspect includes from the one particular value and/or to the other particular value. Similarly, when values are expressed as approximations, by use of the antecedent "about," it will be understood that the particular value forms another aspect.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination, B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "having," "has," and "have" have the same open-ended meaning as "comprising," "comprises," and "comprise" provided above.

As used herein, the terms "including," "includes," and "include" have the same open-ended meaning as "comprising," "comprises," and "comprise" provided above.

"Chosen from" as used herein can be used with "or" or "and." For example, Y is chosen from A, B, and C means Y can be individually A, B, or C. Alternatively, Y is chosen from A, B, or C means Y can be individually A, B, or C; or a combination of A and B, A and C, B and C, or A, B, and C.

The present application discloses a compound according to Formula I:

wherein:
A is

wherein ** indicates the point of attachment,
$R^{1a}$ is

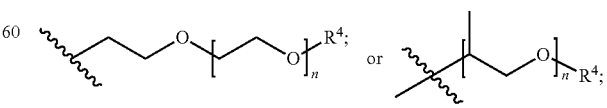

$R^2$ is $(C_{5-10})$aryl; $R^3$ is $(C_{1-10})$alkyl or $(C_{5-10})$aryl; $R^4$ is hydrogen, $(C_{1-12})$alkyl, $(C_{2-12})$alkenyl, or —C(O)$R^5$; $R^5$ is $(C_{1-12})$alkyl unsubstituted or substituted by $R^6$, $(C_{2-12})$alkenyl unsubstituted or substituted by $R^6$, $(C_{3-8})$cycloalkyl, or 5- to 9-membered aryl; each $R^6$ is $(C_{1-4})$alkoxy, or oxo; and n is an integer from 1 to 15.

In some embodiments the invention is a compound according to Formula I:

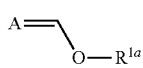

wherein:
A is

wherein ** indicates the point of attachment,
$R^{1a}$ is

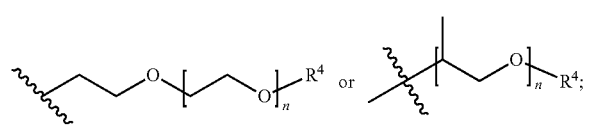

$R^2$ is $(C_{5-10})$aryl; $R^3$ is $(C_{1-10})$alkyl or $(C_{5-10})$aryl; $R^4$ is hydrogen, $(C_{1-12})$alkyl, $(C_{2-12})$alkenyl, or $-C(O)R^5$; $R^5$ is $(C_{1-12})$alkyl unsubstituted or substituted by $R^6$, $(C_{2-12})$alkenyl unsubstituted or substituted by $R^6$, $(C_{3-8})$cycloalkyl, or 5- to 9-membered aryl; each $R^6$ is $(C_{1-4})$alkoxy, or oxo; and n is an integer from 1 to 15.

In another embodiment,
A is

wherein ** indicates the point of attachment.

In some embodiments, $R^2$ is phenyl, substituted phenyl, naphthyl, substituted napththyl, furanyl, or substituted furanyl. In some embodiments, $R^3$ is methyl, ethyl, propyl, butyl, pentyl, heptyl, hexyl, heptyl, octyl, nonyl, or decyl. In some embodiments, $R^3$ is phenyl, substituted phenyl, naphthyl, substituted napththyl, furanyl, or substituted furanyl. In some embodiments n is an integer from 1 to 4.

In some embodiments, $R^2$ is phenyl or substituted phenyl; and $R^3$ is methyl, ethyl, phenyl, or substituted phenyl. In some embodiments n can be an integer from 1 to 4.

In some embodiments, $R^4$ is $-C(O)R^5$. In some embodiments, $R^5$ can be $(C_{1-12})$alkyl unsubstituted or substituted by $R^6$. In some embodiments, $R^5$ can be $(C_{2-12})$alkenyl unsubstituted or substituted by $R^6$. In some embodiments, $R^5$ can be $(C_{3-8})$cycloalkyl. In some embodiments, $R^5$ can be 5- to 9-membered aryl.

In some embodiments, $R^4$ is hydrogen. In some embodiments, $R^4$ is $(C_{1-12})$alkyl.

In some embodiments, $R^4$ is methyl, ethyl, propyl, butyl, pentyl, heptyl, octyl, or nonyl. In some embodiments, $R^4$ is ethyl, propyl, or butyl. In some embodiments, $R^4$ is ethyl or butyl. In some embodiments, $R^4$ is $(C_{2-12})$alkenyl.

In some embodiments, $R^4$ is $-C(O)R^5$. In some embodiments, $R^5$ is $(C_{1-12})$alkyl unsubstituted or substituted by $R^6$. In some embodiments, $R^5$ is methyl, ethyl, propyl, butyl, pentyl, hexyl, heptyl, octyl, or nonyl. In some embodiments, $R^5$ is methyl. In some embodiments, $R^5$ is $(C_{2-12})$alkenyl unsubstituted or substituted by $R^6$.

In some embodiments, $R^5$ is $(C_{3-8})$cycloalkyl. In some embodiments, $R^5$ is cyclobutyl, cyclopenyl, cyclohexyl, cycloheptyl, or cyclooctyl. In some embodiments, $R^5$ is cyclohexyl.

In some embodiments, $R^5$ is a 5- to 9-membered aryl. In some embodiments, $R^5$ is phenyl or naphthyl. In some embodiments, $R^5$ is phenyl.

In some embodiments, n is an integer from 1 to 2. In some embodiments, n is an integer from 1 to 3. In some embodiments, n is an integer from 1 to 4. In some embodiments, n is an integer from 1 to 5. In some embodiments, n is an integer from 1 to 6. In some embodiments, n is an integer from 1 to 7. In some embodiments, n is an integer from 1 to 8. In some embodiments, n is an integer from 1 to 9. In some embodiments, n is an integer from 1 to 10. In some embodiments, n is an integer from 1 to 11. In some embodiments, n is an integer from 1 to 12. In some embodiments, n is an integer from 1 to 13. In some embodiments, n is an integer from 1 to 14. In some embodiments, n is an integer from 1 to 15.

In some embodiments, the compounds of Formula I have a volatile organic content of less than 50 wt % according to ASTM D6886. In some embodiments, the volatile organic content is less than 30 wt %. In embodiments, the volatile organic content is less than 10 wt %. In some embodiments, the volatile organic content is less than 5 wt %. In some embodiments, the volatile organic content is less than 3 wt %. In some embodiments, the volatile organic content is less than 2 wt %. In some embodiments, the volatile organic content is less than 1 wt %. In some embodiments, the volatile organic content is less than 0.8 wt %.

Another embodiment of the invention is an enol ether compound according to Formula II:

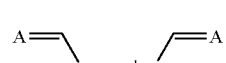

wherein:
each A is independently

wherein ** indicates the point of attachment, or $R^{1c}$ is

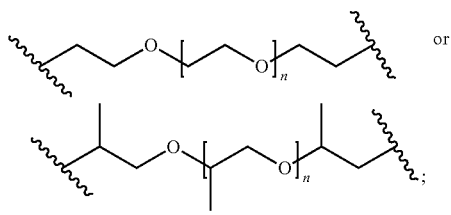

each $R^2$ is independently $(C_{5-10})$aryl; each $R^3$ is independently $(C_{1-10})$alkyl or $(C_{5-10})$aryl; and n is an integer from 1 to 15.

In some embodiments, each A is

wherein ** indicates the point of attachment. In some embodiments of this invention, n is an integer 1 to 3.

In some embodiments, $R^2$ is phenyl, substituted phenyl, naphthyl, substituted napththyl, furanyl, or substituted furanyl. In some embodiments, $R^3$ is methyl, ethyl, propyl, butyl, pentyl, heptyl, hexyl, heptyl, octyl, nonyl, decyl, phenyl, substituted phenyl, naphthyl, substituted napththyl, furanyl, or substituted furanyl. In some embodiments, n is an integer from 1 to 3.

In some embodiments, $R^2$ is phenyl or substituted phenyl; and $R^3$ is methyl, ethyl, phenyl, or substituted phenyl. In some embodiments, n is an integer from 1 to 3.

In some embodiments, $R^2$ is butyl; and $R^3$ is ethyl. In some embodiments, n is an integer from 1 to 3.

In some embodiments, n is an integer from 1 to 2. In some embodiments, n is an integer from 1 to 3. In some embodiments, n is an integer from 1 to 4. In some embodiments, n is an integer from 1 to 5. In some embodiments, n is an integer from 1 to 6. In some embodiments, n is an integer from 1 to 7. In some embodiments, n is an integer from 1 to 8. In some embodiments, n is an integer from 1 to 9. In some embodiments, n is an integer from 1 to 10. In some embodiments, n is an integer from 1 to 11. In some embodiments, n is an integer from 1 to 12. In some embodiments, n is an integer from 1 to 13. In some embodiments, n is an integer from 1 to 14. In some embodiments, n is an integer from 1 to 15.

In some embodiments, the compound of Formula II has a volatile organic content of less than 50 wt % according to ASTM D6886. In one class of this embodiment, the volatile organic content is less than 30 wt %. In one class of this embodiment, the volatile organic content is less than 10 wt %. In one class of this embodiment, the volatile organic content is less than 5 wt %. In one class of this embodiment, the volatile organic content is less than 3 wt %. In one class of this embodiment, the volatile organic content is less than 2 wt %. In one class of this embodiment, the volatile organic content is less than 1 wt %. In one class of this embodiment, the volatile organic content is less than 0.8 wt %.

Compositions

The enol ether compounds disclosed in the present application exhibit a low volatile organic content (less than 50 wt %, but as low as 0.7 wt % according to ASTM D6886) and are desirable for use in coating compositions. The enol ether compounds disclosed in the present application can be used as reactive film-hardening compounds. Reactive film-hardening compounds react with themselves or other components in coating compositions to form bonds in the films providing improved film properties. When we say that the enol ether compounds of this invention can be used as reactive film-hardening additives, we mean when added to a coating composition, that a harder film is obtained upon curing the composition than is obtained in the absence of the enol ether additives, or that the coating composition exhibits a higher gel fraction than in the absence of the enol ether additive, or that both coating composition hardness and increased gel fraction properties are improved by the addition of the enol ether reactive film-hardening additives.

Not wishing to be bound by any theory, the increase in hardness observed in a coating that contains the enol ether additives described herein may be the result of a chemical reaction, so that the additives described herein may be described as "reactive" enol ether film-hardening additives.

The enol ether materials described herein can also facilitate the individual latex particles coming together to form a continuous film at a given temperature by reducing the minimum film-forming temperature (MFFT) of the latex polymer.

In some embodiments, the composition comprises the compound represented by Formula I. In some embodiments, the composition comprises the compound represented Formula II.

The present application also includes a composition comprising the compound of Formula I or II, and a polymer. In some embodiments, the polymer is a latex polymer. In other embodiments, the latex polymer has a $T_g$ in the range of from about −20° C. to about 100° C. In some embodiments, the latex polymer has a $T_g$ in the range of from about 2° C. to about 60° C.

The latex polymer can be chosen from an acrylic, a vinyl acrylic, a styrene butadiene or a styrene acrylic latex polymer. In some embodiments, the latex polymer is an acrylic latex polymer. In some embodiments, the latex polymer is a vinyl latex polymer. In some embodiments, the latex polymer is styrene butadiene latex polymer. In some embodiments, the latex polymer is a styrene acrylic latex polymer.

In an embodiment of this invention, the compound of Formula I or II is present from about 1 to about 20 phr relative to the sum total of the polymer. In some embodiments, the composition has a minimum film formation temperature in the range of from about −35° C. to about 60° C. In some embodiments, the polymer is a latex polymer. In some embodiments, the latex polymer has a $T_g$ in the range of from about −20° C. to about 100° C. In some embodiments, the latex polymer has a $T_g$ in the range of from about 2° C. to about 60° C. In some embodiments, the latex polymer is chosen from an acrylic, a vinyl acrylic, a styrene butadiene, a styrene acrylic latex polymer and blends thereof.

In some embodiments, the composition has a minimum film formation temperature in the range of from about −35° C. to about 60° C. In some embodiments, the polymer is a latex polymer. In some embodiments, the latex polymer has a $T_g$ in the range of from about −20° C. to about 100° C. In some embodiments, the latex polymer has a $T_g$ in the range of from about 2° C. to about 60° C. In some embodiments, the latex polymer is chosen from an acrylic, a vinyl acrylic, a styrene butadiene or a styrene acrylic latex polymer.

In some embodiments, the composition has a minimum film formation temperature in the range of from about −35° C. to about 5° C. In some embodiments, the polymer is a latex polymer. In some embodiments, the latex polymer has a $T_g$ in the range of from about −20° C. to about 100° C. In some embodiments, the latex polymer has a $T_g$ in the range of from about 2° C. to about 60° C. In some embodiments, the latex polymer is chosen from an acrylic, a vinyl acrylic, a styrene butadiene or a styrene acrylic latex polymer.

In some embodiments, the composition has a minimum film formation temperature in the range of from about −35° C. to about 60° C. In some embodiments, the polymer is a latex polymer. In some embodiments, the latex polymer has a $T_g$ in the range of from about −20° C. to about 100° C. In some embodiments, the latex polymer has a $T_g$ in the range of from about 2° C. to about 60° C. In some embodiments, the latex polymer is chosen from an acrylic, a vinyl acrylic, a styrene butadiene or a styrene acrylic latex polymer.

In some embodiments, the composition has a minimum film formation temperature in the range of from about −35° C. to about 2° C. In some embodiments, the polymer is a latex polymer. In some embodiments, the latex polymer has a $T_g$ in the range of from about −20° C. to about 100° C. In some embodiments, the latex polymer has a $T_g$ in the range of from about 2° C. to about 60° C. In some embodiments, the latex polymer is chosen from an acrylic, a vinyl acrylic, a styrene butadiene or a styrene acrylic latex polymer.

In one class of this embodiment, the compound of Formula I or II is present from about 1 to about 15 phr relative to the sum total of the polymer. In some embodiments, the composition has a minimum film formation temperature in the range of from about −35° C. to about 60° C. In some embodiments, the polymer is a latex polymer. In some embodiments, the latex polymer has a $T_g$ in the range of from about −20° C. to about 100° C. In some embodiments, the latex polymer has a $T_g$ in the range of from about 2° C. to about 60° C. In some embodiments, the latex polymer is chosen from an acrylic, a vinyl acrylic, a styrene butadiene or a styrene acrylic latex polymer.

In some embodiments, the composition has a minimum film formation temperature in the range of from about −35° C. to about 60° C. In some embodiments, the polymer is a latex polymer. In some embodiments, the latex polymer has a $T_g$ in the range of from about −20° C. to about 100° C. In some embodiments, the latex polymer has a $T_g$ in the range of from about 2° C. to about 60° C. In some embodiments, the latex polymer is chosen from an acrylic, a vinyl acrylic, a styrene butadiene or a styrene acrylic latex polymer.

In some embodiments, the composition has a minimum film formation temperature in the range of from about −35° C. to about 5° C. In some embodiments, the polymer is a latex polymer. In some embodiments, the latex polymer has a $T_g$ in the range of from about −20° C. to about 100° C. In some embodiments, the latex polymer has a $T_g$ in the range of from about 2° C. to about 60° C. In some embodiments, the latex polymer is chosen from an acrylic, a vinyl acrylic, a styrene butadiene or a styrene acrylic latex polymer.

In some embodiments, the composition has a minimum film formation temperature in the range of from about −35° C. to about 60° C. In some embodiments, the polymer is a latex polymer. In some embodiments, the latex polymer has a $T_g$ in the range of from about −20° C. to about 100° C. In some embodiments, the latex polymer has a $T_g$ in the range of from about 2° C. to about 60° C. In some embodiments, the latex polymer is chosen from an acrylic, a vinyl acrylic, a styrene butadiene or a styrene acrylic latex polymer.

In some embodiments, the composition has a minimum film formation temperature in the range of from about −35° C. to about 2° C. In some embodiments, the polymer is a latex polymer. In some embodiments, the latex polymer has a $T_g$ in the range of from about −20° C. to about 100° C. In some embodiments, the latex polymer has a $T_g$ in the range of from about 2° C. to about 60° C. In some embodiments, the latex polymer is chosen from an acrylic, a vinyl acrylic, a styrene butadiene or a styrene acrylic latex polymer.

In one class of this embodiment, the compound of Formula I or II is present from about 1 to about 10 phr relative to the sum total of the polymer. In some embodiments, the composition has a minimum film formation temperature in the range of from about −35° C. to about 60° C. In some embodiments, the polymer is a latex polymer. In some embodiments, the latex polymer has a $T_g$ in the range of from about −20° C. to about 100° C. In some embodiments, the latex polymer has a $T_g$ in the range of from about 2° C. to about 60° C. In some embodiments, the latex polymer is chosen from an acrylic, a vinyl acrylic, a styrene butadiene or a styrene acrylic latex polymer.

In some embodiments, the composition has a minimum film formation temperature in the range of from about −35° C. to about 60° C. In some embodiments, the polymer is a latex polymer. In some embodiments, the latex polymer has a $T_g$ in the range of from about −20° C. to about 100° C. In some embodiments, the latex polymer has a $T_g$ in the range of from about 2° C. to about 60° C. In some embodiments, the latex polymer is chosen from an acrylic, a vinyl acrylic, a styrene butadiene or a styrene acrylic latex polymer.

In some embodiments, the composition has a minimum film formation temperature in the range of from about −35° C. to about 5° C. In some embodiments, the polymer is a latex polymer. In some embodiments, the latex polymer has a $T_g$ in the range of from about −20° C. to about 100° C. In some embodiments, the latex polymer has a $T_g$ in the range of from about 2° C. to about 60° C. In some embodiments, the latex polymer is chosen from an acrylic, a vinyl acrylic, a styrene butadiene or a styrene acrylic latex polymer.

In some embodiments, the composition has a minimum film formation temperature in the range of from about −35° C. to about 60° C. In some embodiments, the polymer is a latex polymer. In some embodiments, the latex polymer has a $T_g$ in the range of from about −20° C. to about 100° C. In some embodiments, the latex polymer has a $T_g$ in the range of from about 2° C. to about 60° C. In some embodiments, the latex polymer is chosen from an acrylic, a vinyl acrylic, a styrene butadiene or a styrene acrylic latex polymer.

In some embodiments, the composition has a minimum film formation temperature in the range of from about −35° C. to about 2° C. In some embodiments, the polymer is a latex polymer. In some embodiments, the latex polymer has a $T_g$ in the range of from about −20° C. to about 100° C. In some embodiments, the latex polymer has a $T_g$ in the range of from about 2° C. to about 60° C. In some embodiments, the latex polymer is chosen from an acrylic, a vinyl acrylic, a styrene butadiene or a styrene acrylic latex polymer.

In one class of this embodiment, the compound of Formula I or II is present from about 1 to about 8 phr relative to the sum total of the polymer. In some embodiments, the composition has a minimum film formation temperature in the range of from about −35° C. to about 60° C. In some embodiments, the polymer is a latex polymer. In some embodiments, the latex polymer has a $T_g$ in the range of from about −20° C. to about 100° C. In some embodiments, the latex polymer has a $T_g$ in the range of from about 2° C. to about 60° C. In some embodiments, the latex polymer is chosen from an acrylic, a vinyl acrylic, a styrene butadiene or a styrene acrylic latex polymer.

In some embodiments, the composition has a minimum film formation temperature in the range of from about −35° C. to about 60° C. In some embodiments, the polymer is a latex polymer. In some embodiments, the latex polymer has a $T_g$ in the range of from about −20° C. to about 100° C. In some embodiments, the latex polymer has a $T_g$ in the range of from about 2° C. to about 60° C. In some embodiments, the latex polymer is chosen from an acrylic, a vinyl acrylic, a styrene butadiene or a styrene acrylic latex polymer.

In some embodiments, the composition has a minimum film formation temperature in the range of from about −35° C. to about 5° C. In some embodiments, the polymer is a latex polymer. In some embodiments, the latex polymer has a $T_g$ in the range of from about −20° C. to about 100° C. In some embodiments, the latex polymer has a $T_g$ in the range of from about 2° C. to about 60° C. In some embodiments, the latex polymer is chosen from an acrylic, a vinyl acrylic, a styrene butadiene or a styrene acrylic latex polymer.

In some embodiments, the composition has a minimum film formation temperature in the range of from about −35° C. to about 60° C. In some embodiments, the polymer is a latex polymer. In some embodiments, the latex polymer has a $T_g$ in the range of from about −20° C. to about 100° C. In some embodiments, the latex polymer has a $T_g$ in the range of from about 2° C. to about 60° C. In some embodiments, the latex polymer is chosen from an acrylic, a vinyl acrylic, a styrene butadiene or a styrene acrylic latex polymer.

In some embodiments, the composition has a minimum film formation temperature in the range of from about −35° C. to about 2° C. In some embodiments, the polymer is a latex polymer. In some embodiments, the latex polymer has a $T_g$ in the range of from about −20° C. to about 100° C. In some embodiments, the latex polymer has a $T_g$ in the range of from about 2° C. to about 60° C. In some embodiments, the latex polymer is chosen from an acrylic, a vinyl acrylic, a styrene butadiene or a styrene acrylic latex polymer.

In one class of this embodiment, the compound of Formula I or II is present from about 1 to about 6 phr relative to the sum total of the polymer. In some embodiments, the composition has a minimum film formation temperature in the range of from about −35° C. to about 60° C. In some embodiments, the polymer is a latex polymer. In some embodiments, the latex polymer has a $T_g$ in the range of from about −20° C. to about 100° C. In some embodiments, the latex polymer has a $T_g$ in the range of from about 2° C. to about 60° C. In some embodiments, the latex polymer is chosen from an acrylic, a vinyl acrylic, a styrene butadiene or a styrene acrylic latex polymer.

In some embodiments, the composition has a minimum film formation temperature in the range of from about −35° C. to about 60° C. In some embodiments, the polymer is a latex polymer. In some embodiments, the latex polymer has a $T_g$ in the range of from about −20° C. to about 100° C. In some embodiments, the latex polymer has a $T_g$ in the range of from about 2° C. to about 60° C. In some embodiments, the latex polymer is chosen from an acrylic, a vinyl acrylic, a styrene butadiene or a styrene acrylic latex polymer.

In some embodiments, the composition has a minimum film formation temperature in the range of from about −35° C. to about 5° C. In some embodiments, the polymer is a latex polymer. In some embodiments, the latex polymer has a $T_g$ in the range of from about −20° C. to about 100° C. In some embodiments, the latex polymer has a $T_g$ in the range of from about 2° C. to about 60° C. In some embodiments, the latex polymer is chosen from an acrylic, a vinyl acrylic, a styrene butadiene or a styrene acrylic latex polymer.

In some embodiments, the composition has a minimum film formation temperature in the range of from about −35° C. to about 60° C. In some embodiments, the polymer is a latex polymer. In some embodiments, the latex polymer has a $T_g$ in the range of from about −20° C. to about 100° C. In some embodiments, the latex polymer has a $T_g$ in the range of from about 2° C. to about 60° C. In some embodiments, the latex polymer is chosen from an acrylic, a vinyl acrylic, a styrene butadiene or a styrene acrylic latex polymer.

In some embodiments, the composition has a minimum film formation temperature in the range of from about −35° C. to about 2° C. In some embodiments, the polymer is a latex polymer. In some embodiments, the latex polymer has a $T_g$ in the range of from about −20° C. to about 100° C. In some embodiments, the latex polymer has a $T_g$ in the range of from about 2° C. to about 60° C. In some embodiments, the latex polymer is chosen from an acrylic, a vinyl acrylic, a styrene butadiene or a styrene acrylic latex polymer.

In one class of this embodiment, the compound of Formula I or II is present from about 1 to about 5 phr relative to the sum total of the polymer. In some embodiments, the composition has a minimum film formation temperature in the range of from about −35° C. to about 60° C. In some embodiments, the polymer is a latex polymer. In some embodiments, the latex polymer has a $T_g$ in the range of from about −20° C. to about 100° C. In some embodiments, the latex polymer has a $T_g$ in the range of from about 2° C. to about 60° C. In some embodiments, the latex polymer is chosen from an acrylic, a vinyl acrylic, a styrene butadiene or a styrene acrylic latex polymer.

In some embodiments, the composition has a minimum film formation temperature in the range of from about −35° C. to about 60° C. In some embodiments, the polymer is a latex polymer. In some embodiments, the latex polymer has a $T_g$ in the range of from about −20° C. to about 100° C. In some embodiments, the latex polymer has a $T_g$ in the range of from about 2° C. to about 60° C. In some embodiments, the latex polymer is chosen from an acrylic, a vinyl acrylic, a styrene butadiene or a styrene acrylic latex polymer.

In some embodiments, the composition has a minimum film formation temperature in the range of from about −35° C. to about 5° C. In some embodiments, the polymer is a latex polymer. In some embodiments, the latex polymer has a $T_g$ in the range of from about −20° C. to about 100° C. In some embodiments, the latex polymer has a $T_g$ in the range of from about 2° C. to about 60° C. In some embodiments, the latex polymer is chosen from an acrylic, a vinyl acrylic, a styrene butadiene or a styrene acrylic latex polymer.

In some embodiments, the composition has a minimum film formation temperature in the range of from about −35° C. to about 60° C. In some embodiments, the polymer is a latex polymer. In some embodiments, the latex polymer has a $T_g$ in the range of from about −20° C. to about 100° C. In some embodiments, the latex polymer has a $T_g$ in the range of from about 2° C. to about 60° C. In some embodiments, the latex polymer is chosen from an acrylic, a vinyl acrylic, a styrene butadiene or a styrene acrylic latex polymer.

In some embodiments, the composition has a minimum film formation temperature in the range of from about −35° C. to about 2° C. In some embodiments, the polymer is a latex polymer. In some embodiments, the latex polymer has a $T_g$ in the range of from about −20° C. to about 100° C. In some embodiments, the latex polymer has a $T_g$ in the range of from about 2° C. to about 60° C. In some embodiments, the latex polymer is chosen from an acrylic, a vinyl acrylic, a styrene butadiene or a styrene acrylic latex polymer.

In one class of this embodiment, the compound of Formula I or II is present from about 1 to about 4 phr relative to the sum total of the polymer. In some embodiments, the composition has a minimum film formation temperature in the range of from about −35° C. to about 60° C. In some embodiments, the polymer is a latex polymer. In some embodiments, the latex polymer has a $T_g$ in the range of from about −20° C. to about 100° C. In some embodiments, the latex polymer has a $T_g$ in the range of from about 2° C. to about 60° C. In some embodiments, the latex polymer is chosen from an acrylic, a vinyl acrylic, a styrene butadiene or a styrene acrylic latex polymer.

In some embodiments, the composition has a minimum film formation temperature in the range of from about −35° C. to about 60° C. In some embodiments, the polymer is a latex polymer. In some embodiments, the latex polymer has a $T_g$ in the range of from about −20° C. to about 100° C. In some embodiments, the latex polymer has a $T_g$ in the range of from about 2° C. to about 60° C. In some embodiments, the latex polymer is chosen from an acrylic, a vinyl acrylic, a styrene butadiene or a styrene acrylic latex polymer.

In some embodiments, the composition has a minimum film formation temperature in the range of from about −35° C. to about 5° C. In some embodiments, the polymer is a latex polymer. In some embodiments, the latex polymer has a $T_g$ in the range of from about −20° C. to about 100° C. In some embodiments, the latex polymer has a $T_g$ in the range of from about 2° C. to about 60° C. In some embodiments, the latex polymer is chosen from an acrylic, a vinyl acrylic, a styrene butadiene or a styrene acrylic latex polymer.

In some embodiments, the composition has a minimum film formation temperature in the range of from about −35° C. to about 60° C. In some embodiments, the polymer is a latex polymer. In some embodiments, the latex polymer has a $T_g$ in the range of from about −20° C. to about 100° C. In some embodiments, the latex polymer has a $T_g$ in the range of from about 2° C. to about 60° C. In some embodiments, the latex polymer is chosen from an acrylic, a vinyl acrylic, a styrene butadiene or a styrene acrylic latex polymer.

In some embodiments, the composition has a minimum film formation temperature in the range of from about −35° C. to about 2° C. In some embodiments, the polymer is a latex polymer. In some embodiments, the latex polymer has a $T_g$ in the range of from about −20° C. to about 100° C. In some embodiments, the latex polymer has a $T_g$ in the range of from about 2° C. to about 60° C. In some embodiments, the latex polymer is chosen from an acrylic, a vinyl acrylic, a styrene butadiene or a styrene acrylic latex polymer.

In one embodiment, the compound of Formula I or II has a volatile organic content of less than 50 wt % according to ASTM D6886. In one embodiment, the compound of Formula I or II has a volatile organic content of less than 40 wt % according to ASTM D6886. In one embodiment, the compound of Formula I or II has a volatile organic content of less than 30 wt % according to ASTM D6886. In one embodiment, the compound of Formula I or II has a volatile organic content of less than 20 wt % according to ASTM D6886. In one embodiment, the compound of Formula I or II has a volatile organic content of less than 10 wt % according to ASTM D6886. In one embodiment, the compound of Formula I or II has a volatile organic content of less than 5 wt % according to ASTM D6886.

In one embodiment, the compound of Formula I or II are enol ethers represented by Formulas 1-26(a,b) and isomers thereof:

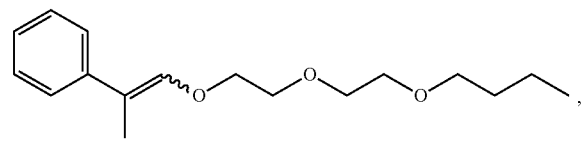

1

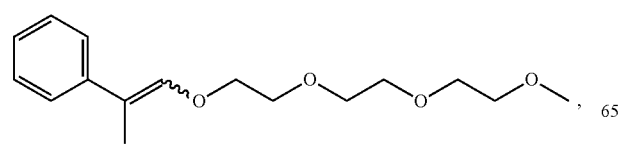

2

-continued

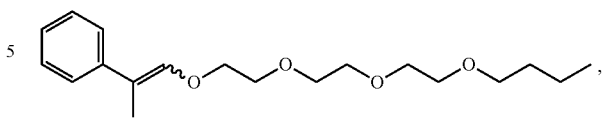

3

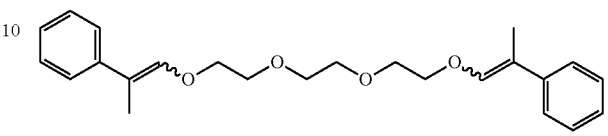

4a

+

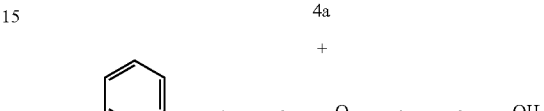

4b

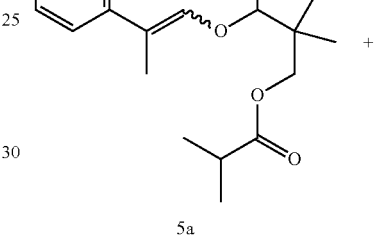

5a

+

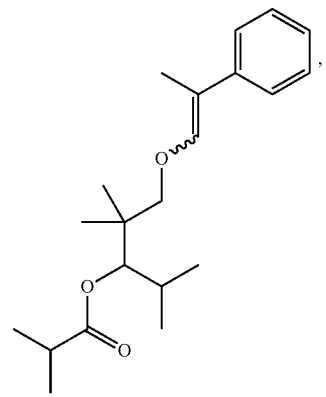

5b

6

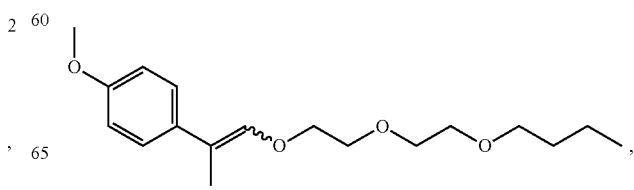

7

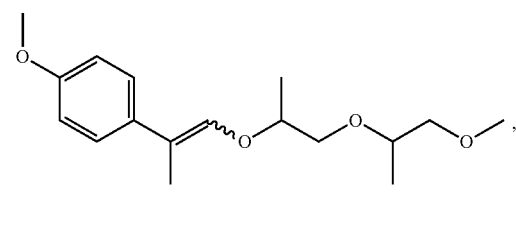
8
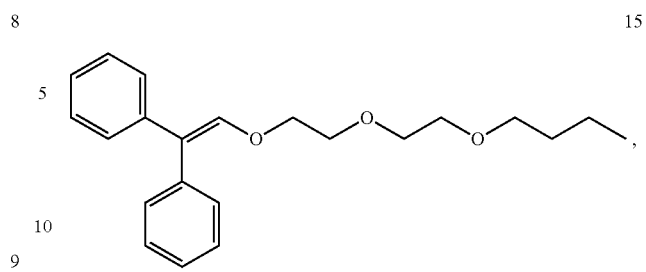
15
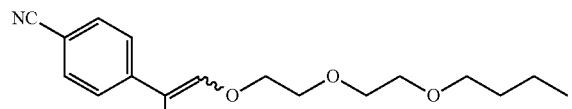
9
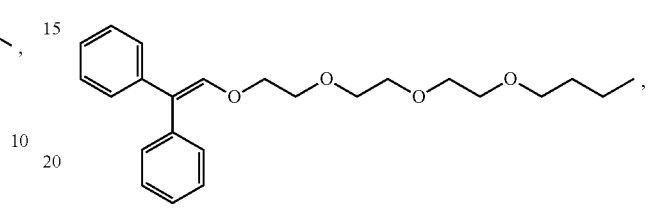
16
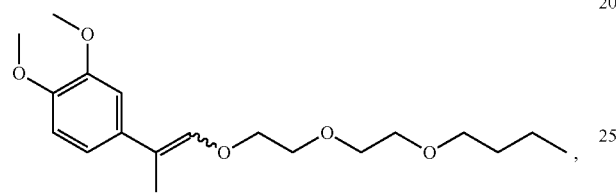
10
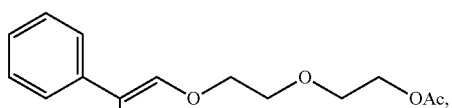
17
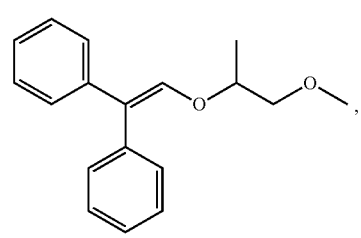
11
18
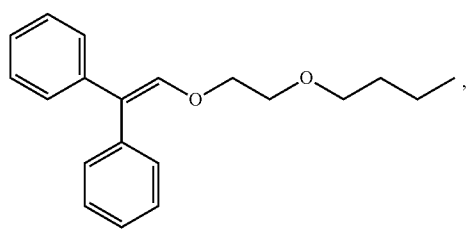
12
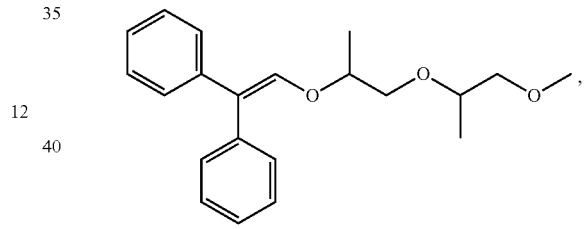
19
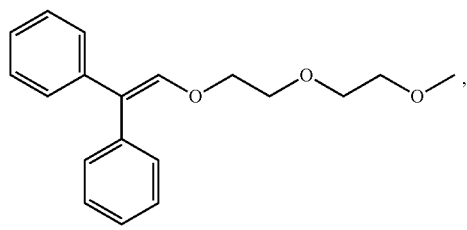
13
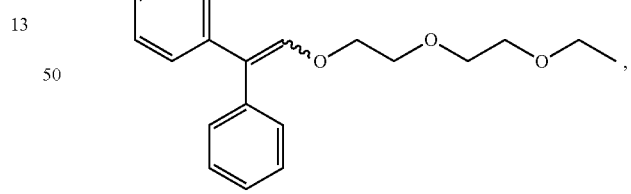
20
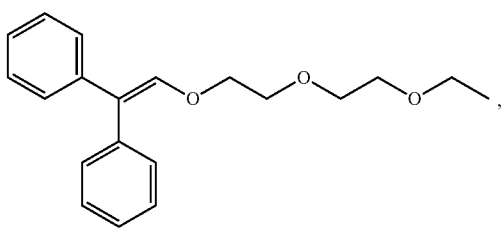
14
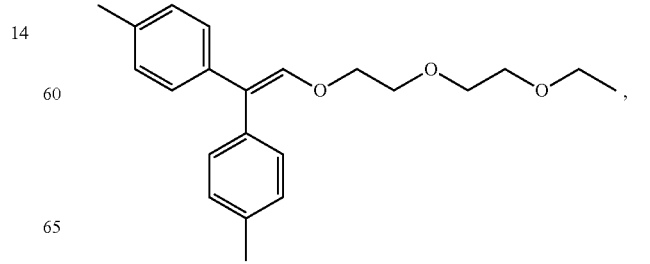

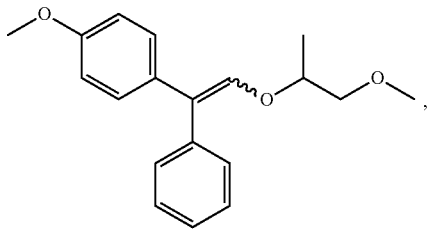

21

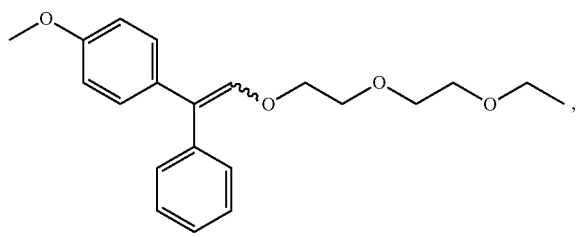

22

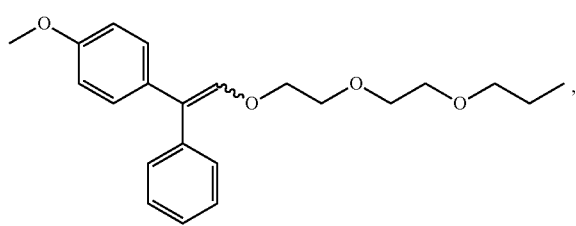

23

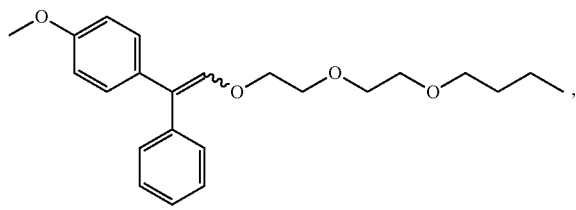

24

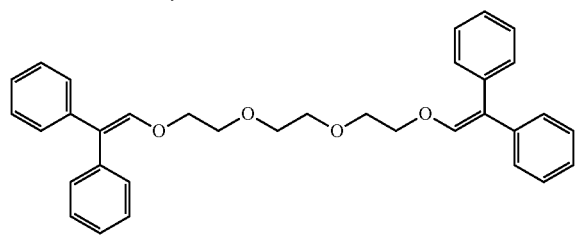

25a
+
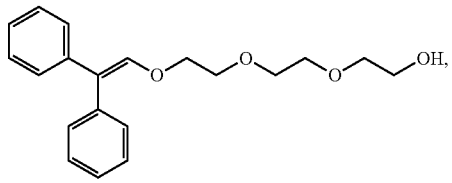

25b

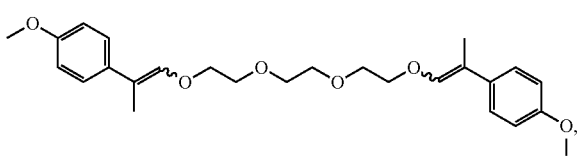

26a

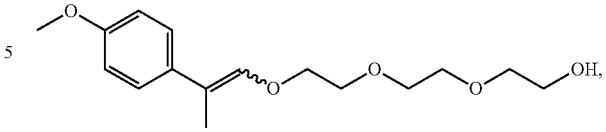

26b and isomers thereof.

The enol ethers depicted by Formulas 1-26(a,b) are representative of the enol ethers claimed herein. Isomers of the enol ethers depicted by Formulas 1-26(a,b) are expected to be produced during synthesis of the enol ethers depicted by Formulas 1-26(a,b). All isomers of the enol ethers depicted by Formulas 1-26(a,b) and are within the scope of the claims set forth herein.

The compounds (i.e., Formula I or II) of the present invention which are useful as film-hardening additives according to the invention include those having a weight percent volatile content of less than 50%, as measured according to ASTM Method D6886. This test may be conducted generally by heating the sample in a forced air oven at 110° C. for 60 minutes. The weight loss after the test is deemed to result from a loss of volatiles originally present in the sample; the percent volatile present in the original sample may then be calculated. Although the cited test can be conducted on coating compositions containing other components such as latex polymers, the values cited herein may be obtained from a sample of the additive itself. The weight percent volatile of a reactive film-hardening aid may be used herein as a yardstick to measure the amount of VOC the additive would contribute to the VOC of a coating composition.

Examples of the "latex polymers" useful according to the invention include aqueous vinyl polymers, which are the reaction products of one or more ethylenically unsaturated monomers. Examples of the ethylenically unsaturated monomers include, but are not limited to, styrene, methyl acrylate, methyl methacrylate, ethyl acrylate, ethyl methacrylate, butyl acrylate, butyl methacrylate, isobutyl acrylate, isobutyl methacrylate, ethylhexyl acrylate, 2-ethylhexyl methacrylate, 2-ethylhexyl acrylate, isoprene, octyl acrylate, octyl methacrylate, iso-octyl acrylate, iso-octyl methacrylate, acrylic acid, methacrylic acid, itaconic acid, crotonic acid, O-methyl styrene, vinyl naphthalene, vinyl toluene, chloromethyl styrene, hydroxyethyl (meth)acrylate, hydroxypropyl (meth)acrylate, acrylonitrile, glycidyl methacrylate, acetoacetoxyethyl methacrylate, acetoacetoxy ethyl acrylate, vinyl chloride, vinylidene chloride, vinyl acetate, butyl acrylamide, ethyl acrylamide, 2-hydroxyethyl methacrylate phosphate, and the like.

Latex emulsion polymers are well known in the art of coating compositions, and we do not intend the term to be limiting, although some latex emulsion polymers may be better suited as coating compositions, either inherently or in combination with the reactive film-hardening additives of the invention. Examples of commercial latex emulsion polymers useful according to the invention include Rhoplex SG-30, Rhoplex HG-74P, Rhoplex HG-95, Rhoplex SG-10M, Rhoplex AC2508, Ucar 626, and Ucar 379G (all available from The Dow Chemical Company), Acronal 296D (BASF Corp.), Aquamac 705 and Aquamac 588 (Hexion Specialty Chemicals), and the like.

In some embodiments, the polymer is a latex polymer, and the latex polymers useful according to the invention may be a homopolymer, or a copolymer of an ethylenically unsaturated monomer and one or more additional copolymerizable monomers.

Some of the latex emulsion polymers useful according to the invention are addition polymers that may be formed via a free radical addition polymerization. In such addition polymers, the propagating species may be a free radical, and the polymer is formed in a chain-growth fashion polymerization as understood in the art. As noted, these polymers are latex emulsion polymers in which a monomer solution may be emulsified in an aqueous solution, and under agitation reacted via a free-radical polymerization process as described herein, to form latex particles.

Some of the water-based latexes that are useful according to the invention may generally be prepared by polymerizing acrylic (ethylenically unsaturated) monomers. Before conducting polymerization, these ethylenically unsaturated monomers are either pre-emulsified in water/surfactant mixture or used as such.

The polymerization process of making these 'acrylic' latexes may also require an initiator (oxidant), a reducing agent, or a catalyst. Suitable initiators include conventional initiators such as ammonium persulfate, sodium persulfate, hydrogen peroxide, t-butyl hydroperoxide, ammonium or alkali sulfate, di-benzoyl peroxide, lauryl peroxide, di-tertiarybutylperoxide, 2,2-azobisisobutyronitrile, benzoyl peroxide, and the like.

Suitable reducing agents are those which increase the rate of polymerization and include, for example, sodium bisulfite, sodium hydrosulfite, sodium formaldehyde sulfoxylate, ascorbic acid, isoascorbic acid, and mixtures thereof.

Suitable catalysts are those compounds which promote decomposition of the polymerization initiator under the polymerization reaction conditions thereby increasing the rate of polymerization. Suitable catalysts include transition metal compounds and driers. Examples of such catalysts include, but are not limited to ferrous sulfate heptahydrate, ferrous chloride, cupric sulfate, cupric chloride, cobalt acetate, cobaltous sulfate, and mixtures thereof.

In some embodiments of this invention, the latex polymers are prepared from monomers characterized as being ethylenically unsaturated monomers that can participate in addition polymerization reactions. As used herein, ethylenically unsaturated monomers may also be described as vinyl monomers. The polymers made from such monomers are addition polymers, and may be formed as emulsion polymers, also known as latexes or latex emulsions.

In some embodiments, the latex polymers useful according to the invention may have pendant moieties, meaning that the ethylenically unsaturated monomers used to prepare the latex polymers of the invention have been reacted into an addition polymer, and that a portion of the monomers remains as a pendant moiety. Alternatively, we may say that the polymers have residues from the ethylenically unsaturated monomers of the invention, in which case we mean that the monomers have been reacted into an addition polymer via their ethylenic unsaturation, and that a portion of the monomers remains as a residue. Both these descriptions are well-known in the art of addition polymers, and the descriptions are not otherwise intended to be especially limiting.

In some embodiments, the invention relates to the use of emulsion polymers which are also known as latexes, or as used herein, latex emulsions. In these latexes, the polymers formed may have a particle size ranging, for example, from about 80 nm to about 300 nm, or from 100 nm to 250 nm, or from 125 nm to 200 nm. The Teofsuch latexes may range, for example, from about 0° C. to about 80° C., or from 15° C. to 60° C., or from 20° C. to 40° C.

In some embodiments, the latex polymers useful according to the invention may be prepared by an emulsion free-radical polymerization of ethylenically unsaturated monomers. These latex polymers may be homopolymers or may be copolymers formed from more than one ethylenically unsaturated monomer.

Examples of ethylenically unsaturated monomers include, but are not limited to, acrylic and methacrylic acid esters such as methyl (meth)acrylate, ethyl (meth)acrylate, propyl (meth)acrylate, isopropyl (meth)acrylate, butyl (meth)acrylate, isobutyl (meth)acrylate, hexyl (meth)acrylate, isooctyl (meth)acrylate, isodecyl (meth)acrylate, lauryl (meth)acrylate, stearyl (meth)acrylate, phenoxyethyl (meth)acrylate, methoxyethyl (meth)acrylate, benzyl (meth)acrylate, ethoxyethyl (meth)acrylate, 2-ethylhexyl (meth)acrylate, cyclopentyl (meth)acrylate and isobutyl (meth)acrylate, as well as combinations of these monomers. A combination of these monomers may be used in order to achieve an appropriate Tg or other properties for the latex emulsion polymer.

Such acrylic and methacrylic acid esters having a C1-C20 alcohol moiety are commercially available or can be prepared by known esterification processes. The acrylic and methacrylic acid ester may contain additional functional groups, such as, hydroxyl, amine, halogen, ether, carboxylic acid, amide, nitrile, and alkyl group. Such esters include carbodiimide (meth)acrylate, methyl (meth)acrylate, ethyl (meth)acrylate, butyl (meth)acrylate, isobutyl (meth)acrylate, ethylhexyl (meth)acrylate, octyl (meth)acrylate, isobutyl (meth)acrylate, allyl (meth)acrylate, and glycidyl (meth)acrylate.

Additional suitable polymerizable ethylenically unsaturated monomers include styrenic monomers. Styrenic monomers include styrene, as well as substituted styrenes such as C1-C6 alkyl ring-substituted styrene, C1-C3 alkyl alpha-substituted styrene or a combination of ring and an alpha-alkyl substituted styrene. Such styrenic polymerizable monomers include styrene, p-methyl styrene, o-methyl styrene, p-butyl styrene, alpha-methyl styrene, and combinations thereof.

In addition, vinyl esters may be used as copolymerizable mono-ethylenically unsaturated monomers, including vinyl esters of vinyl alcohol such as the VEOVA series available from Shell Chemical Company as VEOVA 5, VEOVA 9, VEOVA 10, and VEOVA 11 products. See O. W. Smith, M. J. Collins, P. S. Martin, and D. R. Bassett, Prog. Org. Coatings 22, 19 (1993).

In general, the vinyl monomers may be polymerized by a conventional emulsion free-radical initiated polymerization technique. The polymerization can be initiated by a water soluble or water-dispersible free-radical initiator, optionally in combination with a reducing agent, at an appropriate temperature, for example from 55 to 90° C. The polymerization of the monomers may be conducted batch wise, semi-batch, or in a continuous mode.

A conventional surfactant or a combination of surfactants may be used such as anionic or non-ionic emulsifier in the suspension or emulsion polymerization to prepare a polymer of the invention. Examples of such surfactants include, but are not limited to, alkali or ammonium alkylsulfate, alkylsulfonic acid, or fatty acid, oxyethylated alkylphenol, or any combination of anionic or non-ionic surfactant. A surfactant monomer may be used such as HITENOL HS-20 (which is a polyoxyethylene alkylphenyl ether ammonium sulfate available from DKS International, Inc., Japan). A list of surfactants is available in the treatise: McCutcheon's Emulsifiers & Detergents, North American Edition and International Edition, MC Publishing Co., Glen Rock, N.J. 1993. The amount of the surfactant used is usually between 0.1 to 6 wt %, based on the total weight of the monomers.

As polymerization initiators, any conventional free-radical initiator may be used such as hydrogen peroxide, t-butylhydroperoxide, ammonium or alkali sulfate, di-benzoyl peroxide, lauryl peroxide, di-tertiarybutylperoxide, 2,2'-azobisisobutyronitrile, benzoyl peroxide, and the like. The amount of the initiator is typically between 0.05 to 6.0 wt %, based on the total weight of the total monomers. A free-radical initiator may be combined with a reducing agent to form a redox initiating system. Suitable reducing agents are those which increase the rate of polymerization and include, for example, sodium bisulfite, sodium hydrosulfide, sodium, ascorbic acid, isoascorbic acid and mixtures thereof. The redox initiating system can be used at similar levels as the free-radical initiators.

In addition, in combination with the initiators and reducing agents, polymerization catalysts may be used. Polymerization catalysts are those compounds which increase the rate of polymerization by promoting decomposition of the free radical initiator in combination with the reducing agent at the reaction conditions. Suitable catalysts include transition metal compounds such as, for example, ferrous sulfate heptahydrate, ferrous chloride, cupric sulfate, cupric chloride, cobalt acetate, cobaltous sulfate, and mixtures thereof.

In addition, a low level of a chain transfer agent may also be used to prepare a latex polymer useful in accordance with the invention. Suitable chain transfer agents include, but are not limited to, butyl mercaptan, n-octylmercaptan, n-dodecyl mercaptan, butyl or methyl mercaptopropionate, mercaptopropionic acid, 2-ethylhexyl 3-mercaptopropionate, n-butyl 3-mercaptopropionate, isodecylmercaptan, octadecylmercaptan, mercaptoacetic acid, haloalkyl compounds, (such as carbon tetrabromide and bromodichloromethane), and the reactive chain transfer agents described in U.S. Pat. No. 5,247,040. In particular, mercaptopropionate, allyl mercaptopropionate, allyl mercaptoacetate, crotyl mercaptopropionate and crotyl mercaptoacetate, and mixtures thereof, represent preferred chain transfer agents.

A copolymerizable monomer known to promote wet adhesion may also be incorporated into the polymer. Examples of wet adhesion promoting monomers include, but are not limited to, nitrogen-containing monomers such as t-butylaminoethyl methacrylate, dimethylaminoethyl methacrylate, diethylaminoethyl methacrylate, N,N-dimethylaminopropylmethacrylamide, 2-t-butylaminoethyl methacrylate, N,N dimethylaminoethyl acrylate and N-(2-methacryloyloxy ethyl)ethylene urea.

Water-dispersible and water-soluble polymers may also be employed as surfactants or stabilizers in accordance with the present invention. Examples of such polymeric stabilizers include water-dispersible polyesters as described in U.S. Pat. Nos. 4,946,932 and 4,939,233; water-dispersible polyurethanes as described in U.S. Pat. Nos. 4,927,876 and 5,137,961; and alkali-soluble acrylic resins as described in U.S. Pat. No. 4,839,413. Cellulosics and polyvinyl alcohols may also be used.

Surfactants and stabilizers may be used during the polymerization to control, for example, particle nucleation and growth, particle size and stability or they may be post-added to enhance stability of the latex or to modify other properties of the latex such as surface tension, wettability, and the like.

At least one ethylenically unsaturated copolymerizable surfactant may be employed, for example those possessing isopropenyl phenyl or allyl groups. Copolymerizable surfactants may be anionic, such as containing a sulfate or sulfonate group, or nonionic surfactants. Other copolymerizable surfactants include those containing polyoxyethylene alkyl phenyl ether moieties. Additional copolymerizable surfactants include sodium alkyl allyl sulfosuccinate.

The latex polymers in accordance with the invention may have a weight average molecular weight (Mw), for example, of from 1,000 to 1,000,000, as determined by gel permeation chromatography (GPC), or from 5,000 to 250,000.

The particle size for the aqueous dispersions in accordance with the invention may be, for example, from about 0.01 to about 25 μm, or from 0.05 to 1 μm, or from 0.075 to 500 μm. In an emulsion polymerization in accordance with the invention, the particle size of the latex may range, for example, from 0.01 to 5 μm.

The latex particles generally have a spherical shape, and the spherical polymeric particles may have a core portion and a shell portion or a gradient structure. The core/shell polymer particles may also be prepared in a multi-lobe form, a peanut shell, an acorn form, a raspberry form, or any other form. If the particles have a core/shell structure, the core portion may comprise from about 20 to about 80 wt % of the total weight of the particle, and the shell portion may comprise about 80 to about 20 wt % of the total weight of the particle.

The glass transition temperature (Tg) of the latex polymers in accordance with the present invention, in the absence of the reactive film-hardening additives described herein, may be up to about 100° C. In a preferred embodiment of the present invention, where a film forming at ambient temperatures of the particles is desirable, the glass transition temperature of the polymer itself may preferably be under 60° C.

The latex polymers of the invention may comprise enamine functional polymers, with the enamine functionality serving to improve the hydrolytic stability of the acetoacetoxy group. Enamine functional polymers have been described in Polymer Bulletin 32, 419-426 (1994). Additionally, enamine functional polymers are described in European Patent Application No. 0492847 A2; U.S. Pat. Nos. 5,296,530; and 5,484,849.

The coating compositions of the invention may further comprise other components commonly used in paint formulations, such as, for example, pigments, filler, rheology modifiers, thickeners, wetting and dispersing agents, deformers, freeze-thaw additives, colorants, open-time additives, driers, catalysts, crosslinkers, biocides, light stabilizers, and the like.

The driers are capable of promoting oxidative crosslinking of the unsaturated moieties and providing enhanced coating properties. Examples of commercial driers include Zirconium Hex-Cem®, Cobalt Ten-Cem®, calcium Cem-All®, Zirconium Hydro-Cem®, and Cobalt Hydro-Cure® II sold by OMG Americas of West-Lake, Ohio. Examples of driers based on unsaturated fatty alcohols include oleyl alcohol, linoleyl alcohol, geraniol, or citronellol.

In one embodiment, the composition has a minimum film formation temperature in the range of from about −35° C. to about 60° C. In one embodiment, the composition has a minimum film formation temperature in the range of from about −35° C. to about 5° C. In one embodiment, the composition has a minimum film formation temperature in the range of from about −35° C. to about 60° C. In one embodiment, the composition has a minimum film formation temperature in the range of from about −35° C. to about 2° C.

The minimum film formation temperature of a latex is the lowest temperature at which the latex forms a practical film. MFFT can be measured using ASTM D2354. The film-forming efficiency can be determined by determining the amount of the reactive film-hardening additives required to reduce the MFFT of a latex polymer to 4.4° C., which is the lowest desirable application temperature of a paint. It is generally considered unacceptable if the amount of the reactive film-hardening additives present in a paint formulation exceeds 20% by weight based on the solids of the latex polymer. This is particularly important for a non-volatile additive since the additive will remain in the dried film and cause a detrimental effect on the coating properties such as, for example, hardness, scrub resistance, and block resistance.

EXAMPLES

This invention can be further illustrated by the following examples thereof, although it will be understood that these examples are included merely for purposes of illustration and are not intended to limit the scope of the invention unless otherwise specifically indicated.

Abbreviations:

mL is milliliter; wt % is weight percent; eq is equivalent(s); hrs or h is hour(s); mm is millimeter; m is meter; GC is gas chromatography; ° C. is degree Celsius; min is minute; $t_R$ is retention time; VOC is volatile organic compound; MeP is methyl palmitate; w/v is weight/volume; μL is microliter. RFHA is reactive film-hardening additive.

Example 1: Preparation of (E/Z)-(1-(2-(2-butoxyethoxy)ethoxy)prop-1-en-2-yl)benzene [1]

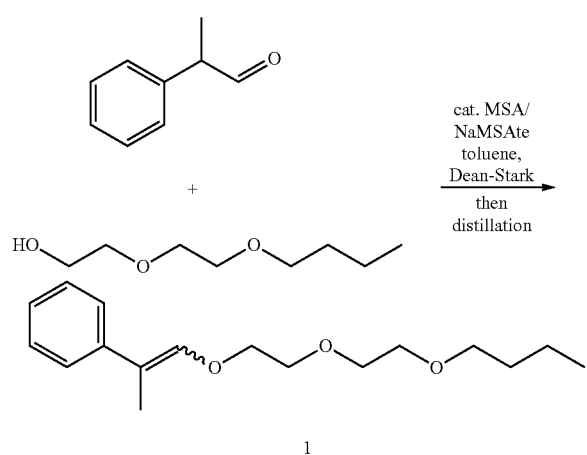

Method 1:

2-phenylpropionaldehyde (100 g) was added to a nitrogen-swept, 1 L 4-necked round-bottom flask fitted with overhead-stirrer, thermocouple, and Dean-Stark. Diethyleneglycol monobutyl ether (260 g) was added all at once, followed by the addition of 250 g of toluene. Sodium methanesulfonate (2.20 g) was added to the flask, followed by the addition of methanesulfonic acid (1.21 mL). The reaction was heated to reflux and held at that temperature for 15 hrs. During that time, ca. 13.5 mL of water collected. The toluene was removed under reduced pressure using a rotary evaporator. Then 50% caustic (0.902 mL) was added all at once. The mixture was fractionally distilled under reduced pressure. The product distilled at a vapor temperature of 188° C. at 3 torr. The product was isolated as a mixture of E/Z isomers and was a near colorless oil (164 g, 79% yield). GC-MS (Instrument A) $t_R$: 9.41 min, 9.58 min (Exact mass: 278.1882, found: 278.1882 m/z).

The remaining examples were prepared according to Method 1.

Example 2: Preparation of (E/Z)-13-phenyl-2,5,8,11-tetraoxatetradec-12-ene [2]

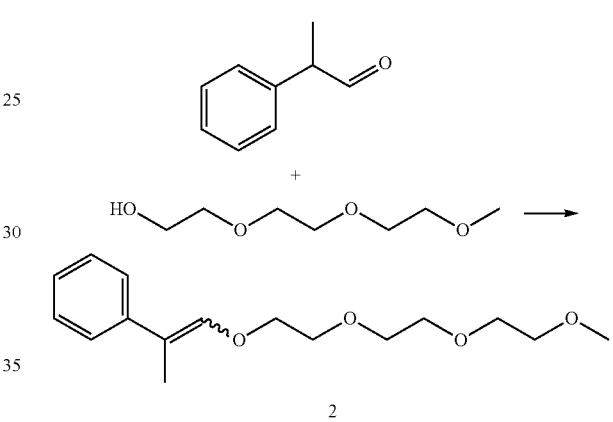

GC-MS (Instrument A) $t_R$: 9.54 min, 9.72 min (Exact mass: 280.1675 m/z, found 280.1675 m/z).

Example 3: Preparation of (E/Z)-2-phenyl-4,7,10,13-tetraoxaheptadec-2-ene [3]

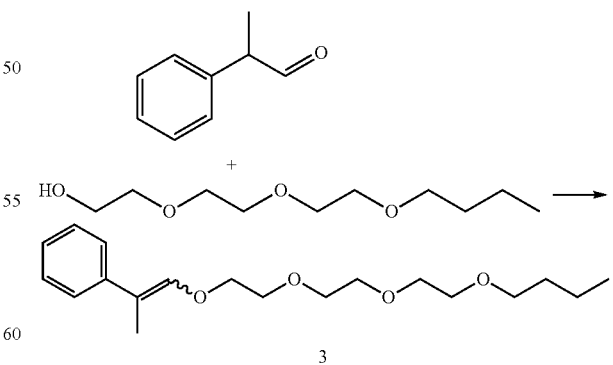

The product enol ether was isolated as a mixture of E/Z isomers and was isolated as a near colorless liquid. GC-MS (Instrument A) $t_R$: 10.49 min, 10.52 min (Exact mass: 322.2144 m/z, found 322.4500 m/z).

Example 4: Preparation of a mixture of (2E/Z, 14E/Z) 2,15-diphenyl-4,7,10,13-tetraoxahexadeca-2,14-diene [4a] and (E/Z)-2-(2-(2-((2-phenylprop-1-en-1-yl)oxy)ethoxy)ethoxy)ethan-1-ol [4b]

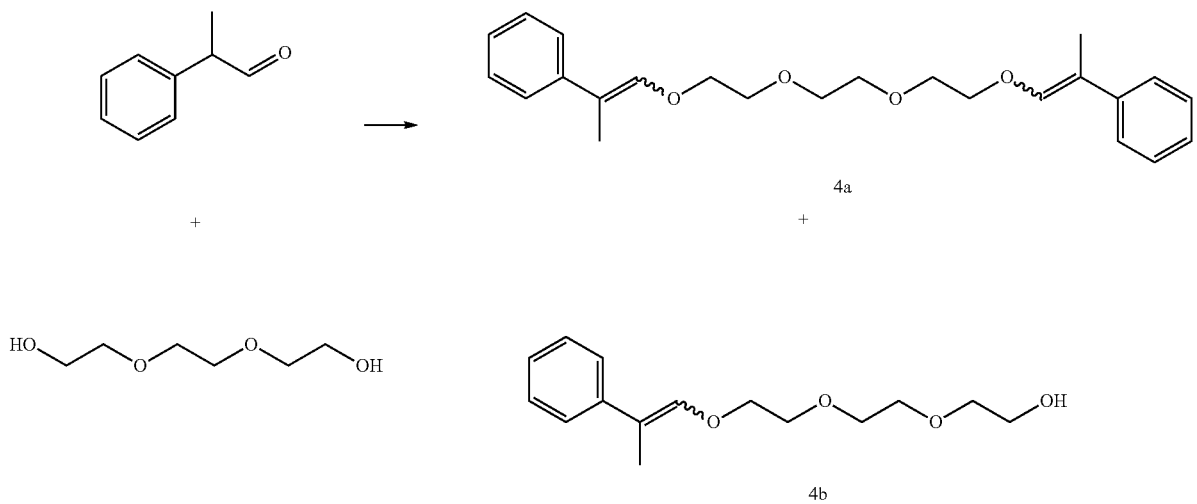

GC-MS (Instrument A) $t_R$: 9.60 min, 9.80 min (Exact mass: 266.1518 m/z, found: 266.1518 m/z), 12.42 min, 12.62 min, 12.84 min (Exact mass: 382.2144 m/z, found: 382.2144 m/z).

Example 5: Preparation of an isomeric mixture of (E/Z)-2,2,4-trimethyl-3-((2-phenylprop-1-en-1-yl)oxy)pentyl isobutyrate [5a] and (E/Z)-2,2,4-trimethyl-1-((2-phenylprop-1-en-1-yl)oxy)pentan-3-yl isobutyrate [5b]

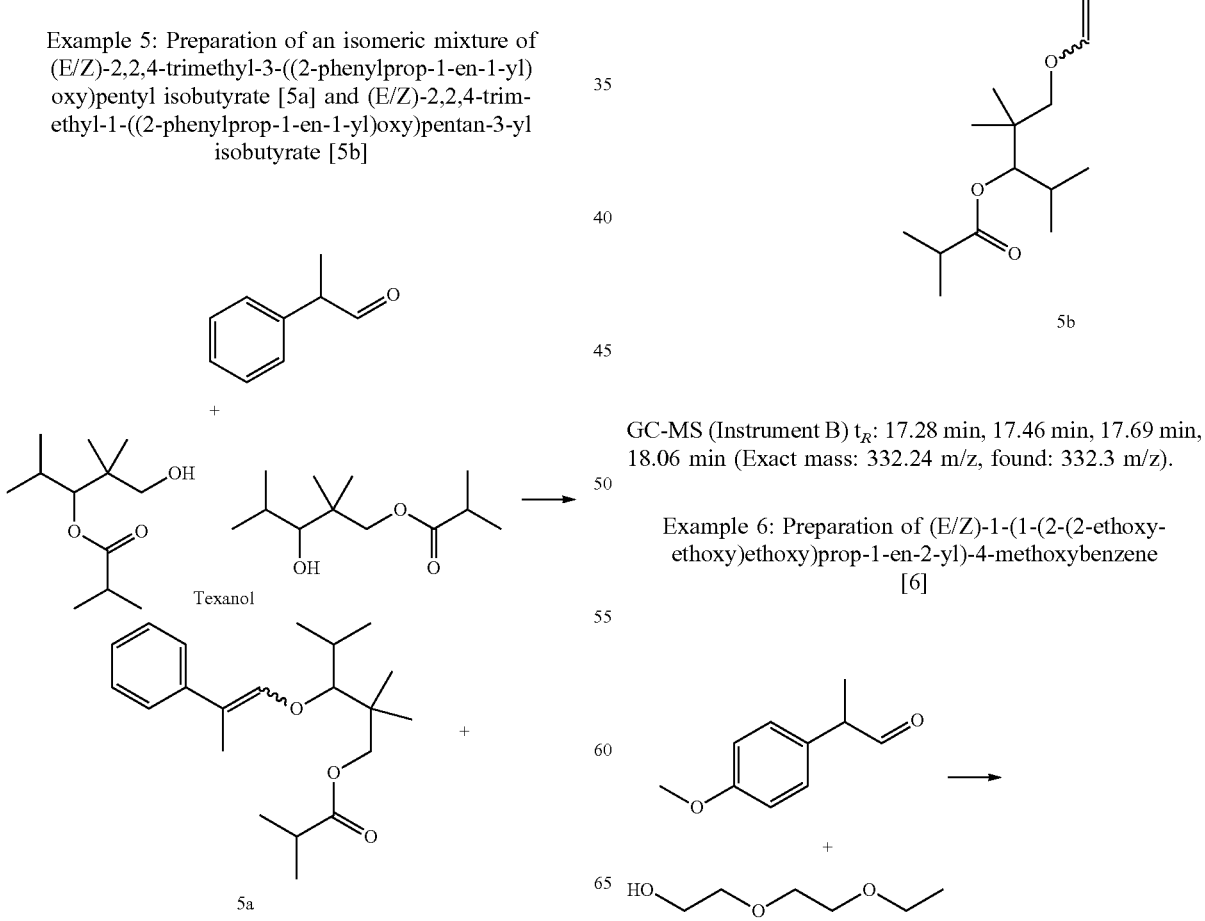

GC-MS (Instrument B) $t_R$: 17.28 min, 17.46 min, 17.69 min, 18.06 min (Exact mass: 332.24 m/z, found: 332.3 m/z).

Example 6: Preparation of (E/Z)-1-(1-(2-(2-ethoxyethoxy)ethoxy)prop-1-en-2-yl)-4-methoxybenzene [6]

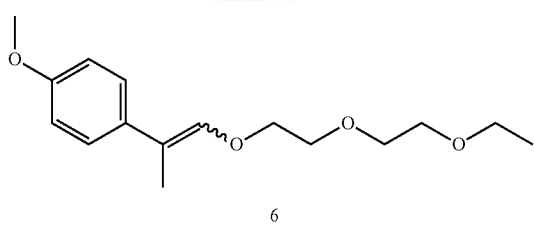

6

GC-MS (Instrument B) $t_R$: 17.41 min, 17.71 min (Exact mass: 280.17 m/z, found: 280.1 m/z).

Example 7: Preparation of (E/Z)-1-(1-(2-(2-butoxyethoxy)ethoxy)prop-1-en-2-yl)-4-methoxybenzene [7]

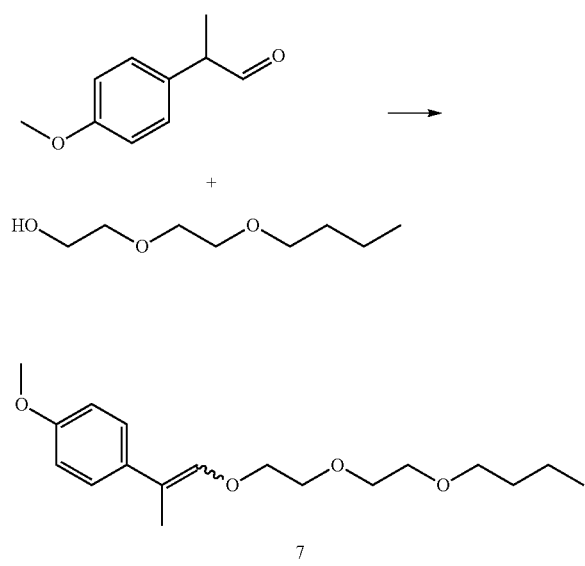 [SMILES: COc1ccc(C(C)C=O)cc1 ; CCCCOCCOCCO ; CCCCOCCOCCOC=C(C)c1ccc(OC)cc1]

7

GC-MS (Instrument B) $t_R$: 18.52 min, 18.91 min (Exact mass: 308.20 m/z, found: 308.3 m/z).

Example 8: Preparation of (E/Z)-1-methoxy-4-(1-((1-((1-methoxypropan-2-yl)oxy)propan-2-yl)oxy)prop-1-en-2-yl)benzene [8]

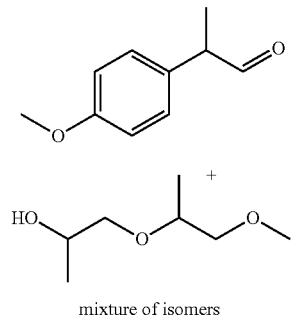

mixture of isomers

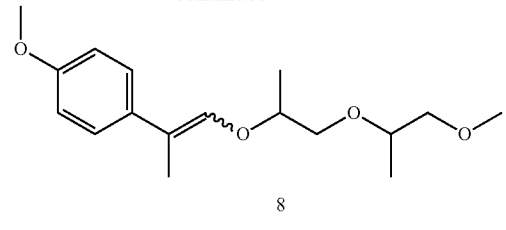

8

GC-MS (Instrument B) $t_R$: 17.09 min, 17.21 min, 17.43 min, 17.55 min (Exact mass: 294.18 m/z, found: 294.1 m/z).

Example 9: Preparation of (E/Z)-4-(1-(2-(2-butoxyethoxy)ethoxy)prop-1-en-2-yl)benzonitrile [9]

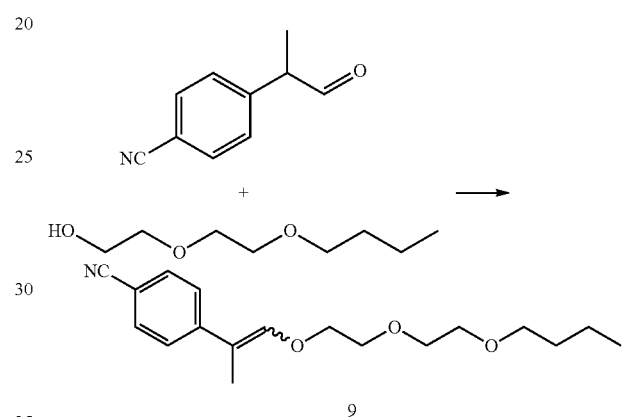

9

GC-MS (Instrument B) $t_R$: 19.31 min, 19.75 min (Exact mass: 303.18 m/z, found: 303.1 m/z).

Example 10: Preparation of (E/Z)-4-(1-(2-(2-butoxyethoxy)ethoxy)prop-1-en-2-yl)-1,2-dimethoxybenzene [10]

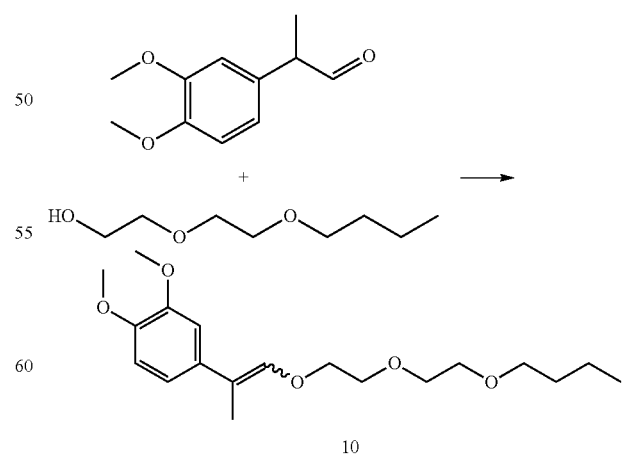

10

GC-MS (Instrument B) $t_R$: 19.64 min, 20.22 min (Exact mass: 338.21 m/z, found: 338.3 m/z).

Example 11: Preparation of (2-((1-methoxypropan-2-yl)oxy)ethene-1,1-diyl)dibenzene [11]

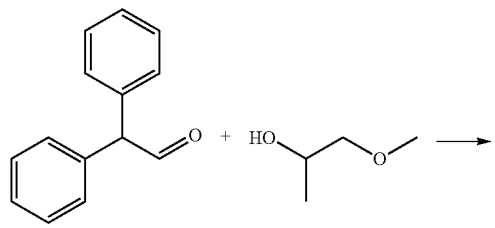

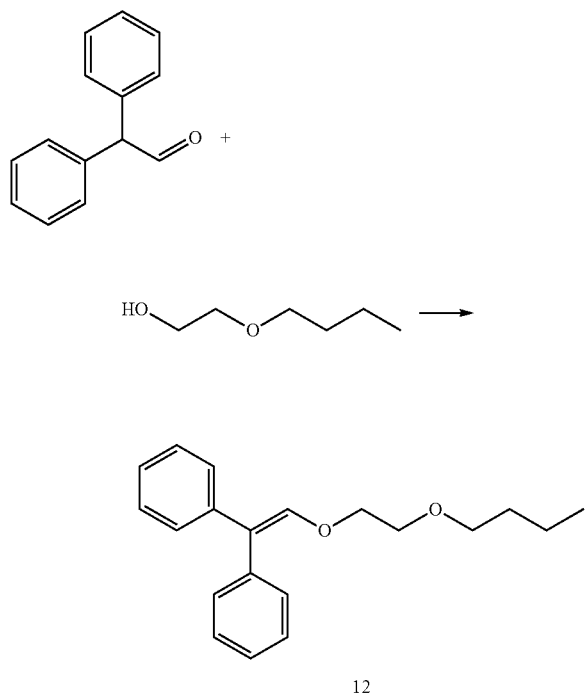

GC-MS (Instrument A) $t_R$: 9.41 min (Exact mass: 268.1463, found: m/z=268.1463).

Example 12: Preparation of (2-(2-butoxyethoxy)ethene-1,1-diyl)dibenzene [12]

GC-MS (Instrument A) $t_R$: 10.34 min (Exact mass: 296.1776 m/z, found: 296.1776 m/z).

Example 13: Preparation of (2-(2-(2-methoxyethoxy)ethoxy)ethene-1,1-diyl)dibenzene [13]

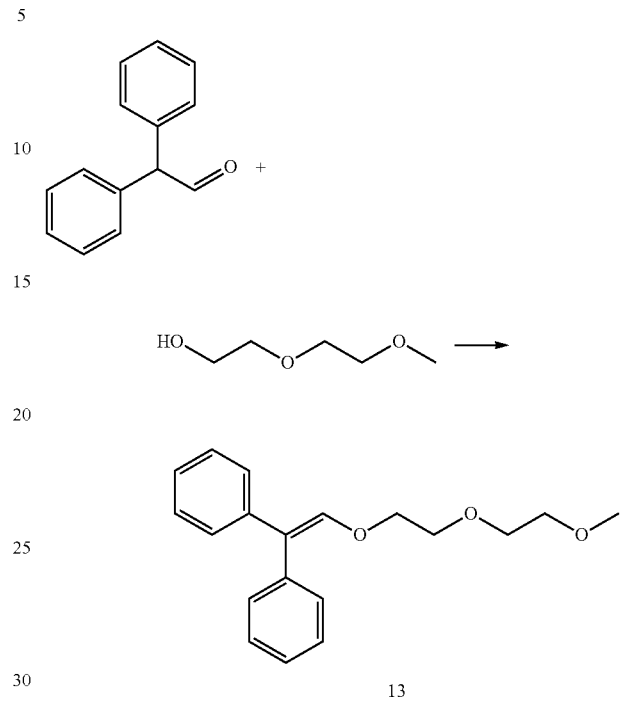

GC-MS (Instrument A) $t_R$: 10.48 min (Exact mass: 298.1569 m/z, found: 298.1569 m/z).

Example 14: Preparation of (2-(2-(2-ethoxyethoxy)ethoxy)ethene-1,1-diyl)dibenzene [14]

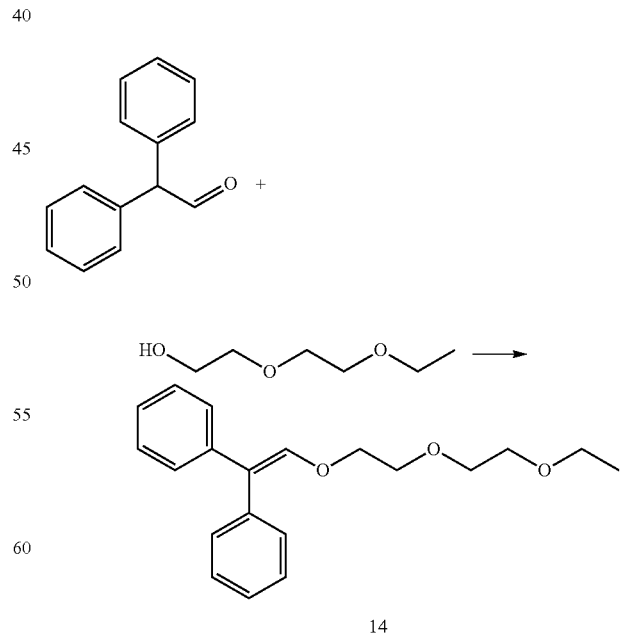

GC-MS (Instrument A) $t_R$: 10.67 min (Exact mass: 312.1725 m/z, found: 312.1725 m/z).

Example 15: Preparation of (2-(2-(2-butoxyethoxy)ethoxy)ethene-1,1-diyl) dibenzene [15]

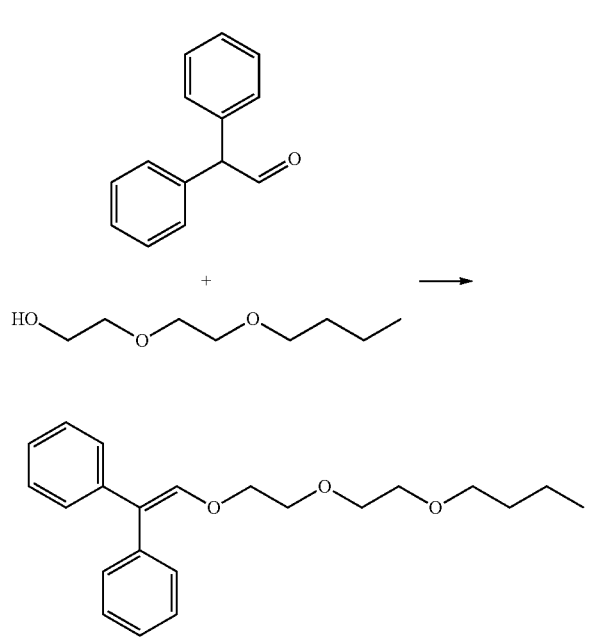

15

GC-MS (Instrument A) $t_R$: 11.29 min (Exact mass: 340.2038 m/z, found: 340.2038 m/z).

Example 16: Preparation of 1,1-diphenyl-3,6,9,12-tetraoxahexadec-1-ene [16]

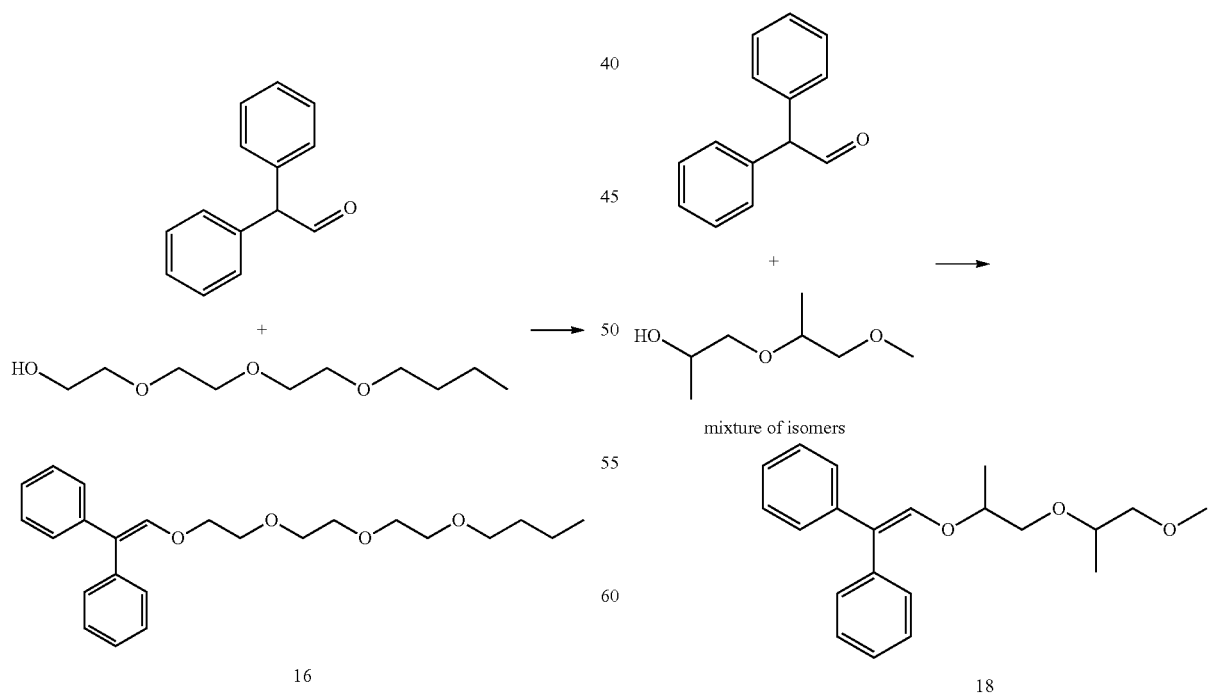

16

GC-MS (Instrument A) $t_R$: 12.18 min (Exact mass: 384.2301 m/z, found: 384.2301 m/z).

Example 17: Preparation of 2-(2-((2,2-diphenylvinyl)oxy)ethoxy)ethyl acetate [17]

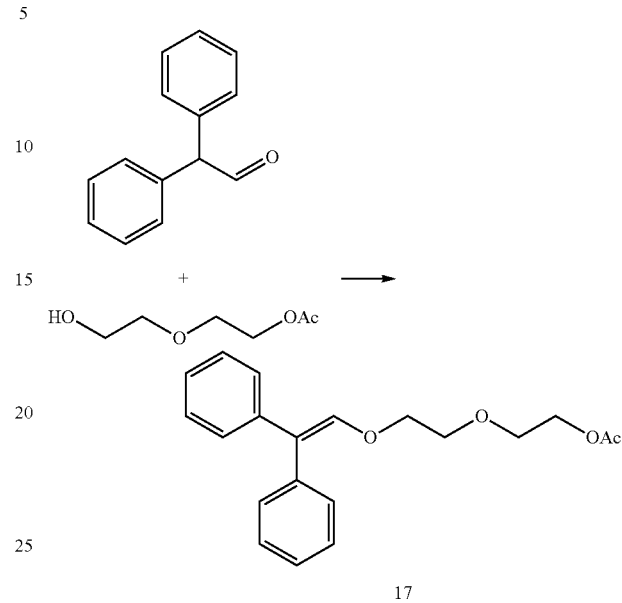

17

GC-MS (Instrument B) $t_R$: 18.69 min, 18.74 min, 18.90 min (Exact mass: 326.19 m/z, found: 326.2 m/z).

Example 18: Preparation of (2-((1-((1-methoxypropan-2-yl)oxy)propan-2-yl)oxy)ethene-1,1-diyl) dibenzene [18]

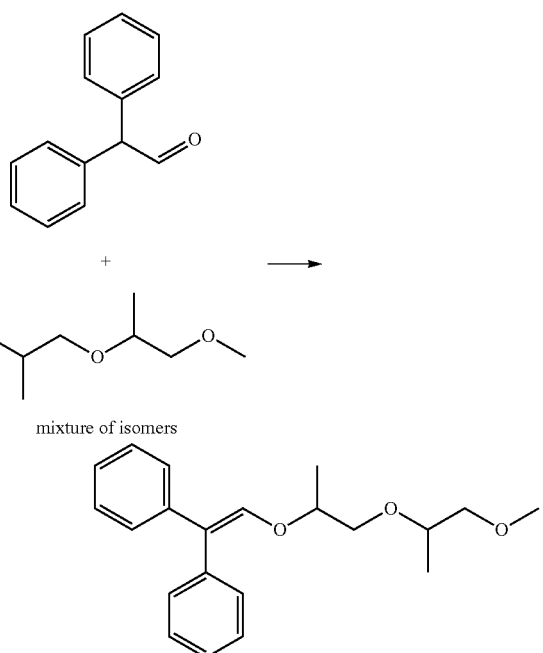

18

GC-MS (Instrument B) $t_R$: 18.69 min, 18.74 min, 18.90 min (Exact mass: 326.19 m/z, found: 326.2 m/z).

Example 19: Preparation of (E/Z)-1-(2-(2-(2-ethoxyethoxy)ethoxy)-1-phenylvinyl)-4-methylbenzene [19]

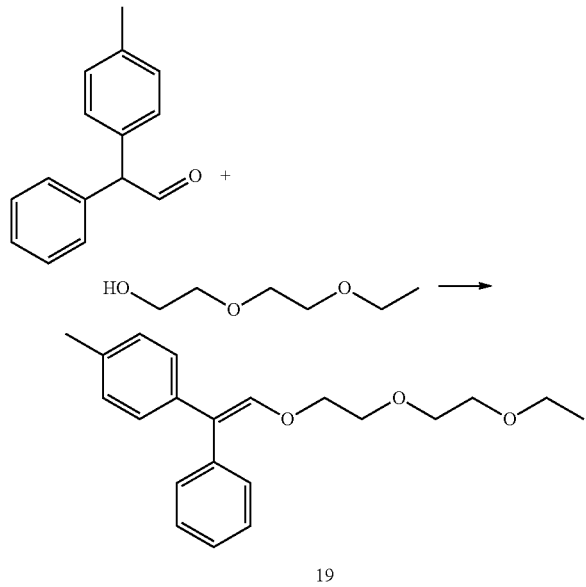

19

GC-MS (Instrument B) $t_R$: 19.94 min, 20.06 min (Exact mass: 326.19 m/z, found 326.3 m/z).

Example 20: Preparation of 4,4'-(2-(2-(2-ethoxyethoxy)ethoxy)ethene-1,1-diyl)bis(methylbenzene) [20]

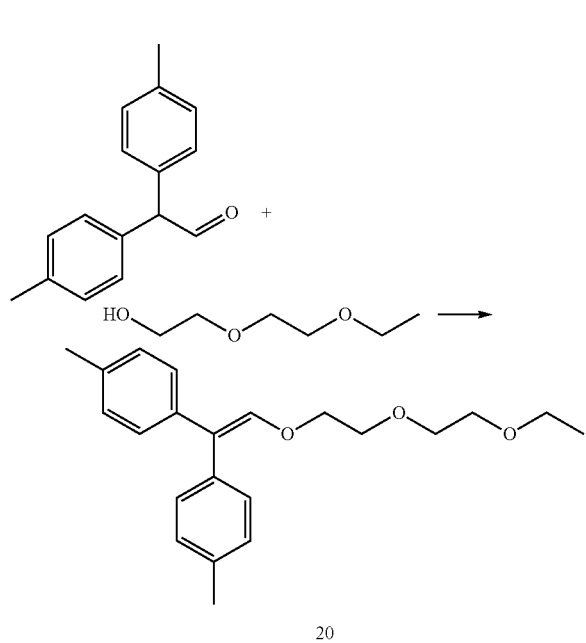

20

GC-MS (Instrument B) $t_R$: 20.95 min (Exact mass: 340.20 m/z, found: 340.3 m/z).

Example 21: Preparation of (E/Z)-1-methoxy-4-(2-((1-methoxypropan-2-yl)oxy)-1-phenylvinyl)benzene [21]

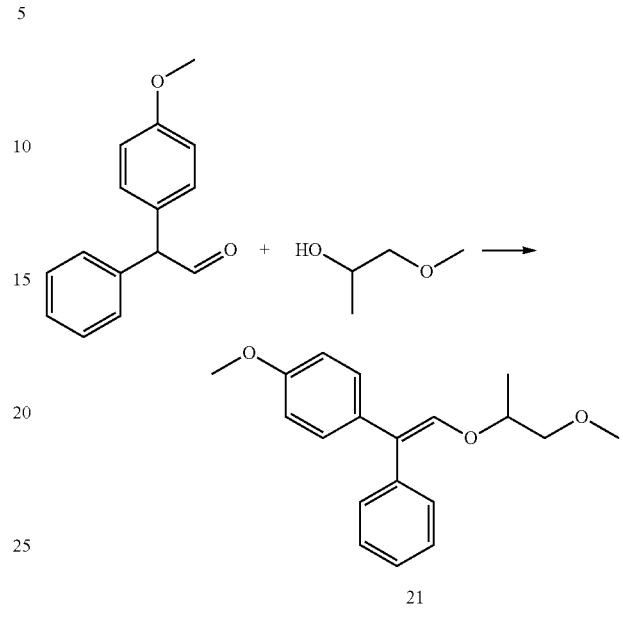

21

GC-MS (Instrument B) tR: 18.58 min, 18.65 (Exact mass: 298.16, found: 298.1 m/z).

Example 22: Preparation of (E/Z)-1-(2-(2-(2-ethoxyethoxy)ethoxy)-1-phenylvinyl)-4-methoxybenzene [22]

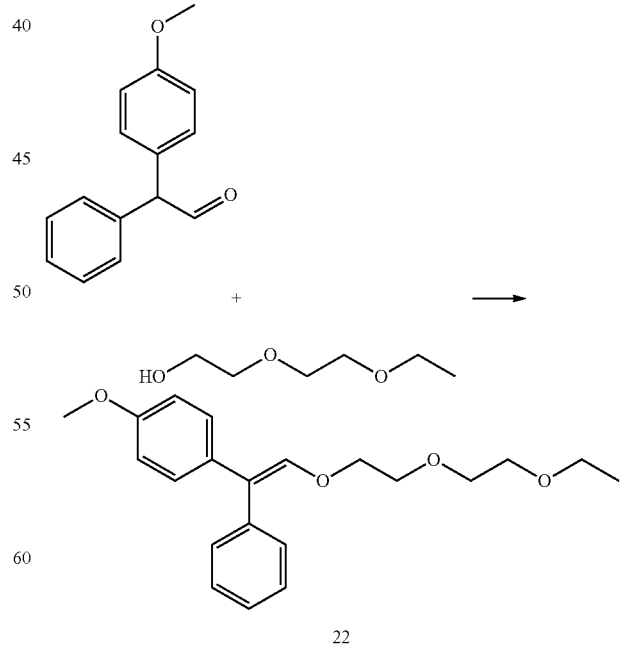

22

GC-MS (Instrument B) $t_R$: 21.17 min, 21.35 min (Exact mass: 342.18 m/z, found: 342.2 m/z).

Example 23: Preparation of (E/Z)-1-methoxy-4-(1-phenyl-2-(2-(2-propoxyethoxy)ethoxy)vinyl)benzene [23]

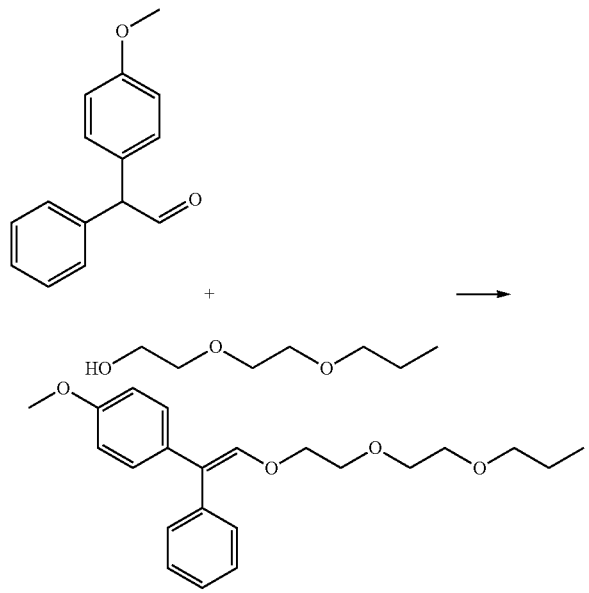

GC-MS (Instrument B) tR: 22.51 min, 22.70 min (Exact mass: 356.20 m/z, found: 356.2 m/z).

Example 24: Preparation of (E/Z)-1-(2-(2-(2-butoxyethoxy)ethoxy)-1-phenylvinyl)-4-methoxybenzene [24]

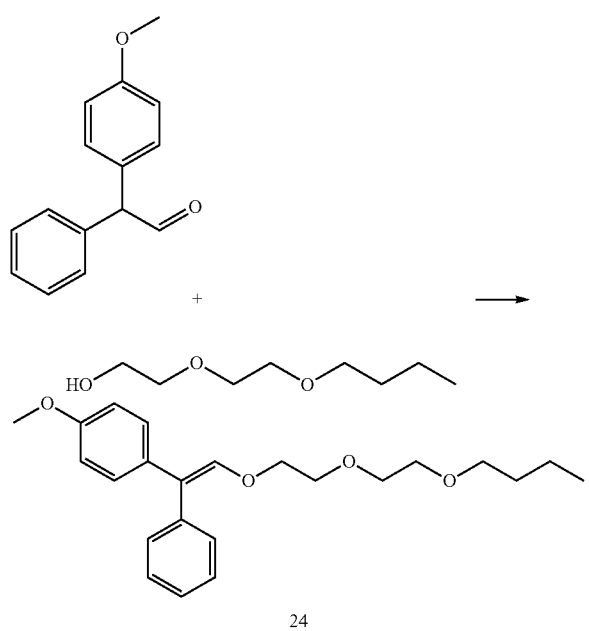

GC-MS (Instrument B) tR: 23.91 min, 24.16 min (Exact mass: 370.21 m/z, found: 370.3 m/z).

Example 25a and 25b: a mixture of 1,1,14,14-tetraphenyl-3,6,9,12-tetraoxatetradeca-1,13-diene [25a] and 2-(2-(2-((2,2-diphenylvinyl)oxy)ethoxy)ethoxy)ethan-1-ol [25b]

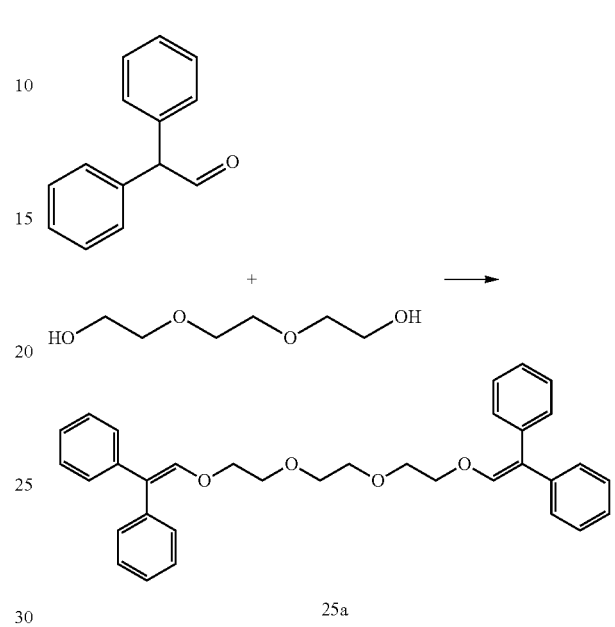

GC-MS (Instrument B) $t_R$: 21.68 min (Exact mass 25b: 328.17 m/z, found: 238.2 m/z), 58.24 min (Exact mass 25a: 506.25 m/z, found: 506.3 m/z).

Example 26a and 26b: Preparation of Example 26, a Mixture of (E/Z, E/Z) 2,15-bis(4-methoxyphenyl)-4,7,10,13-tetraoxahexadeca-2,14-diene [26a] and (E/Z)-2-(2-(2-((2-(4-methoxyphenyl)prop-1-en-1-yl)oxy)ethoxy)ethoxy)ethan-1-ol [26b]

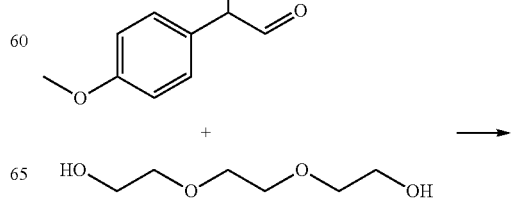

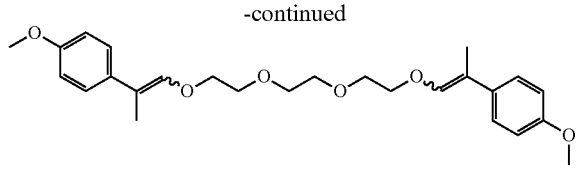

26a

+

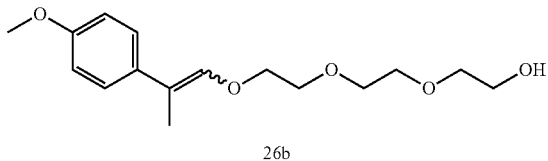

26b

GC-MS (Instrument B) $t_R$: 19.88 min (26b-Exact mass: 296.2 m/z, found: 296.1 m/z), 42.99 min, 47.28 min, 52.19 min (26a-Exact mass: 442.2 m/z, found: 442.3 m/z), Unless noted otherwise, all examples described above are defined as non-VOC by ASTM D6886. This method uses MeP as a standard—if compound $t_R$>MeP $t_R$, compound is defined as non-VOC.

Instrument Parameters—Thermo ISQ GCMS (Instrument A)

Sample Prep: 100 μL sample diluted to 1 mL with toluene; Column: DB-5 30 m×0.25 mm×0.25 μm; Oven Ramp: 0-3 mins at 100° C.; Ramp 25 C/min to 280 C, Hold 15 mins; Injector: Temperature—300° C.; Split Flow—60; Carrier Flow Rate—1.4 mL/min; Volume—0.5 μL; MS: Transfer Line—280° C.; Ion Source Temp—250° C.; Mass Range—16-750 amu. Methyl palmitate $t_R$=8.67 min using the above method.

Instrument Parameters—Agilent 6890N GC with Agilent 5975B VL MSD (Instrument B)

Sample Prep: 100 μL sample diluted to 1 mL with toluene; Column: DB-5 30 m×0.25 mm×0.25 μm; Oven Ramp: 0-4.5 mins at 40° C.; Ramp 20 C/min to 280 C, Hold 53.5 mins; Injector: Temperature—250° C.; Split Flow—65 mL/min; Carrier Flow Rate—1.3 mL/min; Volume—1.0 μL; MS: Transfer Line—280° C.; Ion Source Temp—230° C.; Mass Range—34-700 amu. Methyl palmitate $t_R$=16.6 min using the above method.

TABLE 1

Rhoplex SG-30 Grind Formulation

| Component | Weight (g) |
|---|---|
| Water | 630.00 |
| NATROSOL ™ PLUS 330 (Mix 5 Minutes) | 6.30 |
| TAMOL ™ 165A | 28.56 |
| Triton ™ CF-10 | 8.40 |
| AMP-95 | 8.40 |
| BYK-024 | 10.50 |
| TRONOX ™ 826S | 1477.98 |
| KATHON ™ LX 1.5% (Mix 15 Minutes) | 7.56 |
| Total: | 2177.70 |

TABLE 2

Rhoplex SG-30 Master Paint Formulations

| | Formulation A | Formulation B | Formulation C | Formulation D |
|---|---|---|---|---|
| Common Grind (g) | 518.50 | 518.50 | 518.50 | 518.50 |
| Rhoplex ™ SG-30 (g) | 450.30 | 450.30 | 450.30 | 450.30 |
| Coalescent (g) | Texanol (14.86) | OE400 (15.00) | Citroflex 4 (13.96) | 0 |
| RFHA (g) | 0 | 0 | 0 | Ex 7 (13.96) |
| Acrysol ™ RM-6000 (g) (Mix 10 Minutes) | 20.00 | 20.00 | 20.00 | 20.00 |
| Water | 57.36 | 57.50 | 59.61 | 59.38 |
| Acrysol ™ RM-725 (g) (Final Mix 15 Minutes) | 1.75 | 1.75 | 1.75 | 1.75 |
| Total (g) | 1062.77 | 1063.05 | 1064.12 | 1063.89 |

TABLE 3

Rhoplex SG-30 wet paint formulation stability

| | Initial | | | 24 hr | | | | 1 Week | | | |
|---|---|---|---|---|---|---|---|---|---|---|---|
| Formulation | KU | pH | ICI (poise) | KU | Δ KU | ICI (poise) | pH | KU | Δ KU | ICI (poise) | pH |
| A | 95.6 | 9.38 | 1.064 | 100.8 | 5.2 | 1.073 | 9.41 | 103.2 | 7.6 | 1.144 | 9.37 |
| B | 95.6 | 9.37 | 1.041 | 100.6 | 5.0 | 1.108 | 9.42 | 103.7 | 8.1 | 1.158 | 9.40 |
| C | 95.1 | 9.37 | 0.989 | 99.8 | 4.7 | 1.031 | 9.43 | 103.0 | 7.9 | 1.116 | 9.39 |
| D | 94.7 | 9.39 | 1.078 | 100.2 | 5.5 | 1.027 | 9.42 | 102.2 | 7.5 | 1.102 | 9.45 |

Stormer viscosities were measured with a KU-2 viscometer by Brookfield.
ICI viscosities were measured with a BYK CAP 2000+ viscometer.

TABLE 4

Rhoplex SG-30 28-day König hardness

| Formulation | Dry Time (1 Day) Hardness (sec) | Dry Time (7 Days) Hardness (sec) | Dry Time (14 Days) Hardness (sec) | Dry Time (21 Days) Hardness (sec) | Dry Time (28 Days) Hardness (sec) |
|---|---|---|---|---|---|
| A | 15 | 19 | 24 | 24 | 25 |
| B | 10 | 10 | 10 | 11 | 11 |
| C | 13 | 12 | 13 | 13 | 12 |
| D | 12 | 17 | 20 | 25 | 25 |

Drawdowns of the paints (3 mil wet on aluminum panels) were prepared for König testing.
All drawdowns were stored in a controlled temperature room until use.
König testing was done using BYK Gardner pendulum hardness tester.
Reported values are the average of three measurements per panel.

TABLE 5

Rhoplex SG-30 14-day block resistance

| Formulation | Dry Time (1 Day) Block Resistance | Dry Time (7 Days) Block Resistance | Dry Time (14 Days) Block Resistance |
|---|---|---|---|
| A | 6 | 8 | 9 |
| B | 5 | 6 | 7 |
| C | 5 | 6 | 8 |
| D | 6 | 6 | 7 |

Drawdowns of the paints (6 mil wet on Form BH Leneta charts) were prepared for Block Resistance testing.
All drawdowns were stored in a controlled temperature room until use.
Testing was done based on ASTM method D4946.
Reported values are the average of three measurements per panel.

TABLE 6

Acronal 296D Grind Formulation

| Component | Weight (g) |
|---|---|
| Water | 630.00 |
| NATROSOL ™ PLUS 330 (Mix 5 Minutes) | 6.30 |
| TAMOL ™ 165A | 28.56 |
| Triton ™ CF-10 | 8.40 |
| AMP-95 | 8.40 |
| BYK-024 | 10.50 |
| TRONOX ® 826S | 1477.98 |
| KATHON ™ LX 1.5% (Mix 15 Minutes) | 7.56 |
| Total: | 2177.70 |

TABLE 7

Acronal 296D Master Paint Formulations

| | Formulation A | Formulation B | Formulation C | Formulation D |
|---|---|---|---|---|
| Common Grind (g) | 518.50 | 518.50 | 518.50 | 518.50 |
| Acronal ®296D (g) | 432.00 | 432.00 | 432.00 | 432.00 |
| Coalescent (g) | Texanol (19.01) | OE400 (18.36) | Citroflex 4 (16.20) | 0 |
| RFHA (g) | 0 | 0 | 0 | Ex 7 (15.12) |
| Acrysol ™ RM-6000 (g) (Mix 10 Minutes) | 20.00 | 20.00 | 20.00 | 20.00 |
| Water | 59.70 | 60.74 | 64.17 | 64.95 |
| Acrysol ™ RM-725 (g) (Final Mix 15 Minutes) | 3.40 | 3.40 | 3.40 | 3.40 |
| Total (g) | 1052.61 | 1053.00 | 1054.27 | 1053.97 |

TABLE 8

Acronal 296D Stability of wet paint formulations

| | Initial | | | 24 hr | | | | 1 Week | | | |
|---|---|---|---|---|---|---|---|---|---|---|---|
| Formulation | KU | pH | ICI (poise) | KU | Δ KU | ICI (poise) | pH | KU | Δ KU | ICI (poise) | pH |
| A | 96.3 | 9.05 | 1.383 | 104.2 | 7.9 | 1.355 | 9.08 | 107.2 | 10.9 | 1.383 | 8.92 |
| B | 94.6 | 9.10 | 1.242 | 103.0 | 8.4 | 1.200 | 9.06 | 105.3 | 10.7 | 1.242 | 9.03 |
| C | 94.0 | 9.07 | 1.284 | 101.6 | 7.6 | 1.219 | 9.03 | 104.3 | 10.3 | 1.341 | 8.94 |
| D | 93.8 | 9.06 | 1.313 | 102.8 | 9.0 | 1.308 | 9.04 | 104.6 | 10.8 | 1.388 | 8.93 |

Stormer viscosities were measured with a KU-2 viscometer by Brookfield.
ICI viscosities were measured with a BYK CAP 2000+ viscometer.

TABLE 9

Acronal 296D 28-day König hardness

| Formulation | Dry Time (1 Day) Hardness (sec) | Dry Time (7 Days) Hardness (sec) | Dry Time (14 Days) Hardness (sec) | Dry Time (21 Days) Hardness (sec) | Dry Time (28 Days) Hardness (sec) |
|---|---|---|---|---|---|
| A | 11 | 16 | 20 | 23 | 22 |
| B | 7 | 8 | 8 | 8 | 8 |

TABLE 9-continued

Acronal 296D 28-day König hardness

| Formulation | Dry Time (1 Day) Hardness (sec) | Dry Time (7 Days) Hardness (sec) | Dry Time (14 Days) Hardness (sec) | Dry Time (21 Days) Hardness (sec) | Dry Time (28 Days) Hardness (sec) |
|---|---|---|---|---|---|
| C | 6 | 7 | 8 | 8 | 8 |
| D | 7 | 12 | 18 | 18 | 18 |

Drawdowns of the paints (3 mil wet on aluminum panels) were prepared for König testing.
All drawdowns were stored in a controlled temperature room until use.
König testing was done using BYK Gardner pendulum hardness tester.
Reported values are the average of three measurements per panel.

TABLE 10

Acronal 296D 14-day block resistance

| Formulation | Dry Time (1 Day) Block Resistance | Dry Time (7 Days) Block Resistance | Dry Time (14 Days) Block Resistance |
|---|---|---|---|
| A | 0 | 1 | 3 |
| B | 0 | 0 | 0 |
| C | 0 | 0 | 0 |
| D | 0 | 0 | 1 |

Drawdowns of the paints (6 mil wet on Form BH Leneta charts) were prepared for Block Resistance testing.
All drawdowns were stored in a controlled temperature room until use.
Testing was done based on ASTM method D4946.
Reported values are the average of three measurements per panel.

TABLE 11

Encor 379G Grind Formulation:

| Component | Weight (g) |
|---|---|
| Water | 630.00 |
| NATROSOL ™ PLUS 330 (Mix 5 Minutes) | 12.60 |
| TAMOL ™ 165A | 28.56 |
| Triton ™ CF-10 | 8.40 |
| AMP-95 | 2.10 |
| BYK-024 | 10.50 |
| TRONOX ® 826S | 1477.98 |
| KATHON ™ LX 1.5% (Mix 15 Minutes) | 7.56 |
| Total: | 2177.70 |

TABLE 12

Encor 379G Master Paint Formulations

| | Formulation A | Formulation B | Formulation C | Formulation D |
|---|---|---|---|---|
| Common Grind (g) | 518.50 | 518.50 | 518.50 | 518.50 |
| Encor ® 379G (g) | 416.80 | 416.80 | 416.80 | 416.80 |
| Coalescent (g) | Texanol (11.69) | OE400 (12.15) | Citroflex 4 (12.61) | 0 |
| RFHA (g) | 0 | 0 | 0 | Ex 7 (11.00) |
| Acrysol ™ RM-6000 (g) (Mix 10 Minutes) | 20.00 | 20.00 | 20.00 | 20.00 |
| Water | 94.68 | 94.44 | 94.89 | 96.25 |
| Acrysol ™ RM-725 (g) (Final Mix 15 Minutes) | 6.50 | 6.50 | 6.50 | 6.50 |
| Total (g) | 1068.17 | 1068.39 | 1069.30 | 1069.05 |

TABLE 13

Encor 379G Stability of wet paint formulations

| | Initial | | | 24 hr | | | | 1 Week | | | |
|---|---|---|---|---|---|---|---|---|---|---|---|
| Formulation | KU | pH | ICI (poise) | KU | Δ KU | ICI (poise) | pH | KU | Δ KU | ICI (poise) | pH |
| A | 95.3 | 8.63 | 1.092 | 97.0 | 1.7 | 1.12 | 8.64 | 97.5 | 2.2 | 1.064 | 8.51 |
| B | 94.2 | 8.62 | 1.252 | 96.8 | 2.6 | 1.083 | 8.63 | 95.6 | 1.4 | 1.277 | 8.49 |
| C | 94.5 | 8.63 | 1.102 | 97.9 | 3.4 | 1.078 | 8.63 | 97.1 | 2.6 | 1.064 | 8.50 |
| D | 95.2 | 8.63 | 1.073 | 96.8 | 1.6 | 1.181 | 8.57 | 97.2 | 2.0 | 1.116 | 8.44 |

Stormer viscosities were measured with a KU-2 viscometer by Brookfield.
ICI viscosities were measured with a BYK CAP 2000+ viscometer.

TABLE 14

Encor 379G 28-day König hardness

| Formulation | Dry Time (1 Day) Hardness (sec) | Dry Time (7 Days) Hardness (sec) | Dry Time (14 Days) Hardness (sec) | Dry Time (21 Days) Hardness (sec) | Dry Time (28 Days) Hardness (sec) |
|---|---|---|---|---|---|
| A | 13 | 16 | 15 | 15 | 17 |
| B | 9 | 10 | 9 | 9 | 10 |

TABLE 14-continued

Encor 379G 28-day König hardness

| Formulation | Dry Time (1 Day) Hardness (sec) | Dry Time (7 Days) Hardness (sec) | Dry Time (14 Days) Hardness (sec) | Dry Time (21 Days) Hardness (sec) | Dry Time (28 Days) Hardness (sec) |
|---|---|---|---|---|---|
| C | 10 | 10 | 10 | 10 | 9 |
| D | 10 | 13 | 15 | 17 | 14 |

Drawdowns of the paints (3 mil wet on aluminum panels) were prepared for König testing.
All drawdowns were stored in a controlled temperature room until use.
König testing was done using BYK Gardner pendulum hardness tester.
Reported values are the average of three measurements per panel.

TABLE 15

Encor 379G 21-day block resistance

| Formulation | Dry Time (1 Day) Block Resistance | Dry Time (7 Days) Block Resistance | Dry Time (14 Days) Block Resistance | Dry Time (21 Days) Block Resistance |
|---|---|---|---|---|
| A | 0 | 0 | 0 | 0 |
| B | 0 | 0 | 0 | 0 |
| C | 0 | 0 | 0 | 0 |
| D | 0 | 0 | 0 | 0 |

Drawdowns of the paints (6 mil wet on Form BH Leneta charts) were prepared for Block Resistance testing.
All drawdowns were stored in a controlled temperature room until use.
Testing was done based on ASTM method D4946.
Reported values are the average of three measurements per panel.

TABLE 16

Rhoplex HG-95P Grind formulation

| Component | Weight (g) |
|---|---|
| Water | 525.00 |
| NATROSOL ™ PLUS 330 (Mix 5 Minutes) | 6.30 |
| TAMOL ™ 165A | 28.56 |
| Triton ™ CF-10 | 8.40 |
| AMP-95 | 8.40 |
| BYK-024 | 10.50 |
| TRONOX ® 826S | 1477.98 |
| KATHON ™ LX 1.5% (Mix 15 Minutes) | 7.56 |
| Total: | 2072.70 |

TABLE 17

Rhoplex HG-95P Master Paint Formulation

| | Formulation A | Formulation B | Formulation C | Formulation D |
|---|---|---|---|---|
| Common Grind (g) | 493.50 | 493.50 | 493.50 | 493.50 |
| Rhoplex ™ HG-95P (g) | 486.80 | 486.80 | 486.80 | 486.80 |
| Coalescent | Texanol (25.81) | OE400 (30.79) | Citroflex 4 (28.97) | 0 |
| RFHA (g) | 0 | 0 | 0 | Ex 7 (28.52) |
| Acrysol ™ RM-2020 (g) (Mix 10 Minutes) | 20.00 | 20.00 | 20.00 | 20.00 |
| Water | 36.39 | 31.75 | 35.76 | 35.72 |
| Acrysol ™ RM-725 (g) (Final Mix 15 Minutes) | 1.20 | 1.20 | 1.20 | 1.20 |
| Total (g) | 1063.70 | 1064.03 | 1066.24 | 1065.74 |

TABLE 18

Rhoplex HG-95P Stability of wet paint formulations

| | Initial | | | 24 hr | | | | 1 Week | | | |
|---|---|---|---|---|---|---|---|---|---|---|---|
| Formulation | KU | pH | ICI (poise) | KU | Δ KU | ICI (poise) | pH* | KU | Δ KU | ICI (poise) | pH |
| A | 97.2 | 9.23 | 0.947 | 100.5 | 3.3 | 0.989 | 9.34 | 102.4 | 5.2 | 0.961 | 9.13 |
| B | 98.2 | 9.25 | 1.055 | 102.5 | 4.3 | 1.055 | 9.21 | 103.1 | 4.9 | 1.015 | 9.35 |
| C | 95.8 | 9.15 | 0.980 | 99.4 | 3.6 | 1.031 | 9.20 | 102.3 | 6.5 | 0.980 | 9.12 |
| D | 96.7 | 9.20 | 1.041 | 100.1 | 3.4 | 0.989 | 9.10 | 102.9 | 6.2 | 0.989 | 9.12 |

Stormer viscosities were measured with a KU-2 viscometer by Brookfield.
ICI viscosities were measured with a BYK CAP 2000+ viscometer.
*Measurement was taken at 72 hrs.

TABLE 19

Rhoplex HG-95P 28-day König hardness

| Formulation | Dry Time (1 Day) Hardness (sec) | Dry Time (7 Days) Hardness (sec) | Dry Time (14 Days) Hardness (sec) | Dry Time (21 Days) Hardness (sec) | Dry Time (28 Days) Hardness (sec) |
|---|---|---|---|---|---|
| A | 19 | 24 | 24 | 27 | 29 |
| B | 12 | 13 | 13 | 13 | 15 |

TABLE 19-continued

Rhoplex HG-95P 28-day König hardness

| Formulation | Dry Time (1 Day) Hardness (sec) | Dry Time (7 Days) Hardness (sec) | Dry Time (14 Days) Hardness (sec) | Dry Time (21 Days) Hardness (sec) | Dry Time (28 Days) Hardness (sec) |
|---|---|---|---|---|---|
| C | 14 | 13 | 13 | 14 | 14 |
| D | 15 | 22 | 32 | 34 | 42 |

Drawdowns of the paints (3 mil wet on aluminum panels) were prepared for König testing.
All drawdowns were stored in a controlled temperature room until use.
König testing was done using BYK Gardner pendulum hardness tester.
Reported values are the average of three measurements per panel.

TABLE 20

Rhoplex HG-95P 14-day block resistance

| Formulation | Dry Time (1 Day) Block Resistance | Dry Time (7 Days) Block Resistance | Dry Time (14 Days) Block Resistance |
|---|---|---|---|
| A | 2 | 6 | 6 |
| B | 3 | 5 | 5 |
| C | 3 | 5 | 6 |
| D | 1 | 1 | 6 |

Drawdowns of the paints (6 mil wet on Form BH Leneta charts) were prepared for Block Resistance testing.
All drawdowns were stored in a controlled temperature room until use.
Testing was done based on ASTM method D4946.
Reported values are the average of three measurements per panel.

As shown in the Table 21, the level of reactive film-hardening additive phr required to lower the MFFT of a variety of latex resins is less than 7 phr at 4.0° C. and less than 8.5 phr at 2.0° C., exemplifying the film-forming efficiency of these materials.

TABLE 21

| | Latex | | | | | | | |
|---|---|---|---|---|---|---|---|---|
| | Rhoplex SG-30 | | Acronal 296 D | | Encor 379G | | Rhoplex HG-95P | |
| Ex # | 4.0° C. (phr) | 2.0° C. (phr) | 4.0° C. (phr) | 2.0° C. (phr) | 4.0° C. (phr) | 2.0° C. (phr) | 4.0° C. (phr) | 2.0° C. (phr) |
| Texanol | 4.62 | 5.46 | 6.78 | 7.80 | 2.91 | 4.13 | 9.38 | 10.39 |
| OE400 | 4.82 | 5.68 | 6.51 | 7.53 | 3.04 | 4.33 | 11.38 | 12.56 |
| Citroflex 4 | 4.47 | 5.25 | 5.63 | 6.49 | 3.14 | 4.51 | 10.70 | 11.81 |
| Example 7 | 4.43 | 5.22 | 5.17 | 5.95 | 2.66 | 3.79 | 10.50 | 11.59 |

Parts per hundred resin (PHR) of Texanol, OE400, Citroflex 4, or reactive film-hardening additive required to lower MFFT to 4° C. and 2° C. in Rhoplex SG-30, Acronal 296 D, Encor 379G, and Rhoplex HG-95P model coating systems.

Minimum Film-Forming Temperature (MFFT) Screening: ASTM 02354-10e

MFFT efficiency testing was based on ASTM D2354. The model instrument used was an MFFT-90 bar which allows samples to be tested from −10° C. to 90° C. For waterborne latexes, reaching a temperature of 2° C. is the primary goal. To reach that temperature, the MFFT bar was set to range from 0° C. to 18° C. This range is important since those Tg values for waterborne latexes somewhat correlate with their coinciding MFFT value. The higher the Tg value, the higher the MFFT value and vice versa. Neat commercial architectural latexes typically lie within this temperature range when testing for MFFT efficiency. Depending on the Tg of the material being tested, the range can be adjusted accordingly to determine the film's MFFT.

The ultimate goal for the final paint is to form a continuous film at a low temperature (4° C.). To achieve this, the MFFT of the neat latex material is first determined. If the neat latex material is above an MFFT of 2° C., we will add reactive film-hardening additives at different phr (% additive based on latex solids) levels to allow the latex to reach 2° C. To reach that temperature, a linear regression of the phr levels is performed. This allows one to determine the appropriate amount of reactive film-hardening additive to add to the final paint formulation. In addition to the determined phr values from the MFFT screening, one additional phr is added to the final paint formulation to account for pigmentation.

TABLE 22

Rhoplex SG-30 Grind Formulation

| Component | Weight (g) |
|---|---|
| Water | 630.00 |
| NATROSOL ™ PLUS 330 (Mix 5 Minutes) | 6.30 |
| TAMOL ™ 165A | 28.56 |
| Triton ™ CF-10 | 8.40 |
| AMP-95 | 8.40 |
| BYK-024 | 10.50 |
| TRONOX ® 826S | 1477.98 |
| KATHON ™ LX 1.5% (Mix 15 Minutes) | 7.56 |
| Total: | 2177.70 |

TABLE 23

Rhoplex SG-30 Master Paint Formulations

| | Formulation A | Formulation B | Formulation C | Formulation D |
|---|---|---|---|---|
| Common Grind (g) | 518.50 | 518.50 | 518.50 | 518.50 |
| Rhoplex ™ SG-30 (g) | 450.30 | 450.30 | 450.30 | 450.30 |
| Coalescent (g) | Texanol (14.86) | OE400 (15.00) | Citroflex 4 (13.96) | 0 |
| RFHA (g) | 0 | 0 | 0 | Ex 14 (18.24) |
| Acrysol ™ RM-6000 (g) (Mix 10 Minutes) | 20.00 | 20.00 | 20.00 | 20.00 |

TABLE 23-continued

Rhoplex SG-30 Master Paint Formulations

| | Formulation A | Formulation B | Formulation C | Formulation D |
|---|---|---|---|---|
| Water | 57.36 | 57.50 | 59.61 | 55.76 |
| Acrysol ™ RM-725 (g) (Final Mix 15 Minutes) | 1.75 | 1.75 | 1.75 | 1.75 |
| Total (g) | 1062.77 | 1063.05 | 1064.12 | 1064.55 |

TABLE 24

Rhoplex SG-30 wet paint formulation stability

| | Initial | | | 24 hr | | | | 1 Week | | |
|---|---|---|---|---|---|---|---|---|---|---|
| Formulation | KU | pH | ICI (poise) | KU | Δ KU | ICI (poise) | pH | KU | Δ KU | ICI (poise) | pH |
| A | 95.6 | 9.38 | 1.064 | 100.8 | 5.2 | 1.073 | 9.41 | 103.2 | 7.6 | 1.144 | 9.37 |
| B | 95.6 | 9.37 | 1.041 | 100.6 | 5.0 | 1.108 | 9.42 | 103.7 | 8.1 | 1.158 | 9.40 |
| C | 95.1 | 9.37 | 0.989 | 99.8 | 4.7 | 1.031 | 9.43 | 103.0 | 7.9 | 1.116 | 9.39 |
| D | 96.5 | 9.40 | 1.111 | 100.6 | 4.1 | 1.120 | 9.44 | 103.4 | 6.9 | 1.131 | 9.43 |

Stormer viscosities were measured with a KU-2 viscometer by Brookfield.
ICI viscosities were measured with a BYK CAP 2000+ viscometer.

TABLE 25

Rhoplex SG-30 28-day König hardness

| Formulation | Dry Time (1 Day) Hardness (sec) | Dry Time (7 Days) Hardness (sec) | Dry Time (14 Days) Hardness (sec) | Dry Time (21 Days) Hardness (sec) | Dry Time (28 Days) Hardness (sec) |
|---|---|---|---|---|---|
| A | 15 | 19 | 24 | 24 | 25 |
| B | 10 | 10 | 10 | 11 | 11 |
| C | 13 | 12 | 13 | 13 | 12 |
| D | 11 | 14 | 15 | 18 | 18 |

Drawdowns of the paints (3 mil wet on aluminum panels) were prepared for König testing.
All drawdowns were stored in a controlled temperature room until use.
König testing was done using BYK Gardner pendulum hardness tester.
Reported values are the average of three measurements per panel.

TABLE 26

Rhoplex SG-30 14-day block resistance

| Formulation | Dry Time (1 Day) Block Resistance | Dry Time (7 Days) Block Resistance | Dry Time (14 Days) Block Resistance |
|---|---|---|---|
| A | 6 | 8 | 9 |
| B | 5 | 6 | 7 |
| C | 5 | 6 | 8 |
| D | 5 | 8 | 10 |

Drawdowns of the paints (6 mil wet on Form BH Leneta charts) were prepared for Block Resistance testing.
All drawdowns were stored in a controlled temperature room until use.
Testing was done based on ASTM method D4946.
Reported values are the average of three measurements per panel.

TABLE 27

Acronal 296D Grind Formulation

| Component | Weight (g) |
|---|---|
| Water | 630.00 |
| NATROSOL ™ PLUS 330 (Mix 5 Minutes) | 6.30 |
| TAMOL ™ 165A | 28.56 |
| Triton ™ CF-10 | 8.40 |
| AMP-95 | 8.40 |
| BYK-024 | 10.50 |
| TRONOX ® 826S | 1477.98 |
| KATHON ™ LX 1.5% (Mix 15 Minutes) | 7.56 |
| Total: | 2177.70 |

TABLE 28

Acronal 296D Master Paint Formulations

| | Formulation A | Formulation B | Formulation C | Formulation D |
|---|---|---|---|---|
| Common Grind (g) | 518.50 | 518.50 | 518.50 | 518.50 |
| Acronal ® 296D (g) | 432.00 | 432.00 | 432.00 | 432.00 |
| Coalescent (g) | Texanol (19.01) | OE400 (18.36) | Citroflex 4 (16.20) | 0 |
| RFHA (g) | 0 | 0 | 0 | Ex 14 (19.44) |
| Acrysol ™ RM-6000 (g) (Mix 10 Minutes) | 20.00 | 20.00 | 20.00 | 20.00 |
| Water | 59.70 | 60.74 | 64.17 | 61.34 |
| Acrysol ™ RM-725 (g) (Final Mix 15 Minutes) | 3.40 | 3.40 | 3.40 | 3.40 |
| Total (g) | 1052.61 | 1053.00 | 1054.27 | 1054.68 |

TABLE 29

Acronal 296D Stability of wet paint formulations

| Formulation | Initial | | | 24 hr | | | | 1 Week | | | |
|---|---|---|---|---|---|---|---|---|---|---|---|
| | KU | pH | ICI (poise) | KU | Δ KU | ICI (poise) | pH | KU | Δ KU | ICI (poise) | pH |
| A | 96.3 | 9.05 | 1.383 | 104.2 | 7.9 | 1.355 | 9.08 | 107.2 | 10.9 | 1.383 | 8.92 |
| B | 94.6 | 9.10 | 1.242 | 103.0 | 8.4 | 1.200 | 9.06 | 105.3 | 10.7 | 1.242 | 9.03 |
| C | 94.0 | 9.07 | 1.284 | 101.6 | 7.6 | 1.219 | 9.03 | 104.3 | 10.3 | 1.341 | 8.94 |
| D | 99.4 | 9.07 | 1.378 | 105.9 | 6.4 | 1.406 | 9.04 | 109.5 | 10.1 | 1.406 | 9.06 |

Stormer viscosities were measured with a KU-2 viscometer by Brookfield.
ICI viscosities were measured with a BYK CAP 2000+ viscometer.

TABLE 30

Acronal 296D 28-day König hardness

| Formulation | Dry Time (1 Day) Hardness (sec) | Dry Time (7 Days) Hardness (sec) | Dry Time (14 Days) Hardness (sec) | Dry Time (21 Days) Hardness (sec) | Dry Time (28 Days) Hardness (sec) |
|---|---|---|---|---|---|
| A | 11 | 16 | 20 | 23 | 22 |
| B | 7 | 8 | 8 | 8 | 8 |
| C | 6 | 7 | 8 | 8 | 8 |
| D | 7 | 11 | 15 | 17 | 19 |

Drawdowns of the paints (3 mil wet on aluminum panels) were prepared for König testing.
All drawdowns were stored in a controlled temperature room until use.
König testing was done using BYK Gardner pendulum hardness tester.
Reported values are the average of three measurements per panel.

TABLE 31

Acronal 296D 14-day block resistance

| Formulation | Dry Time (1 Day) Block Resistance | Dry Time (7 Days) Block Resistance | Dry Time (14 Days) Block Resistance |
|---|---|---|---|
| A | 0 | 1 | 3 |
| B | 0 | 0 | 0 |
| C | 0 | 0 | 0 |
| D | 0 | 5 | 5 |

Drawdowns of the paints (6 mil wet on Form BH Leneta charts) were prepared for Block Resistance testing.
All drawdowns were stored in a controlled temperature room until use.
Testing was done based on ASTM method D4946.
Reported values are the average of three measurements per panel.

TABLE 32

Encor 379G Grind Formulation:

| Component | Weight (g) |
|---|---|
| Water | 630.00 |
| NATROSOL ™ PLUS 330 (Mix 5 Minutes) | 12.60 |
| TAMOL ™ 165A | 28.56 |
| Triton ™ CF-10 | 8.40 |
| AMP-95 | 2.10 |
| BYK-024 | 10.50 |
| TRONOX ® 826S | 1477.98 |
| KATHON ™ LX 1.5% (Mix 15 Minutes) | 7.56 |
| Total: | 2177.70 |

TABLE 33

Encor 379G Master Paint Formulations

| | Formulation A | Formulation B | Formulation C | Formulation D |
|---|---|---|---|---|
| Common Grind (g) | 518.50 | 518.50 | 518.50 | 518.50 |
| Encor ® 379G (g) | 416.80 | 416.80 | 416.80 | 416.80 |
| Coalescent (g) | Texanol (11.69) | OE400 (12.15) | Citroflex 4 (12.61) | 0 |
| RFHA (g) | 0 | 0 | 0 | Ex 14 (13.53) |
| Acrysol ™ RM-6000 (g) (Mix 10 Minutes) | 20.00 | 20.00 | 20.00 | 20.00 |
| Water | 94.68 | 94.44 | 94.89 | 94.21 |
| Acrysol ™ RM-725 (g) (Final Mix 15 Minutes) | 6.50 | 6.50 | 6.50 | 6.50 |
| Total (g) | 1068.17 | 1068.39 | 1069.30 | 1069.53 |

TABLE 34

Encor 379G Stability of wet paint formulations

| Formulation | Initial | | | 24 hr | | | | 1 Week | | | |
|---|---|---|---|---|---|---|---|---|---|---|---|
| | KU | pH | ICI (poise) | KU | Δ KU | ICI (poise) | pH | KU | Δ KU | ICI (poise) | pH |
| A | 95.3 | 8.63 | 1.092 | 97.0 | 1.7 | 1.12 | 8.64 | 97.5 | 2.2 | 1.064 | 8.51 |
| B | 94.2 | 8.62 | 1.252 | 96.8 | 2.6 | 1.083 | 8.63 | 95.6 | 1.4 | 1.277 | 8.49 |

TABLE 34-continued

Encor 379G Stability of wet paint formulations

| | Initial | | | 24 hr | | | | 1 Week | | | |
|---|---|---|---|---|---|---|---|---|---|---|---|
| Formulation | KU | pH | ICI (poise) | KU | Δ KU | ICI (poise) | pH | KU | Δ KU | ICI (poise) | pH |
| C | 94.5 | 8.63 | 1.102 | 97.9 | 3.4 | 1.078 | 8.63 | 97.1 | 2.6 | 1.064 | 8.50 |
| D | 95.0 | 8.63 | 1.130 | 98.2 | 3.2 | 1.163 | 8.64 | 97.4 | 2.4 | 1.087 | 8.50 |

Stormer viscosities were measured with a KU-2 viscometer by Brookfield.
ICI viscosities were measured with a BYK CAP 2000+ viscometer.

TABLE 35

Encor 379G 28-day König hardness

| Formulation | Dry Time (1 Day) Hardness (sec) | Dry Time (7 Days) Hardness (sec) | Dry Time (14 Days) Hardness (sec) | Dry Time (21 Days) Hardness (sec) | Dry Time (28 Days) Hardness (sec) |
|---|---|---|---|---|---|
| A | 13 | 16 | 15 | 15 | 17 |
| B | 9 | 10 | 9 | 9 | 10 |
| C | 10 | 10 | 10 | 10 | 9 |
| D | 10 | 11 | 14 | 14 | 13 |

Drawdowns of the paints (3 mil wet on aluminum panels) were prepared for König testing.
All drawdowns were stored in a controlled temperature room until use.
König testing was done using BYK Gardner pendulum hardness tester.
Reported values are the average of three measurements per panel.

TABLE 36

Encor 379G 21-day block resistance

| Formulation | Dry Time (1 Day) Block Resistance | Dry Time (7 Days) Block Resistance | Dry Time (14 Days) Block Resistance | Dry Time (21 Days) Block Resistance |
|---|---|---|---|---|
| A | 0 | 0 | 0 | 0 |
| B | 0 | 0 | 0 | 0 |
| C | 0 | 0 | 0 | 0 |
| D | 0 | 4 | 5 | 6 |

Drawdowns of the paints (6 mil wet on Form BH Leneta charts) were prepared for Block Resistance testing.
All drawdowns were stored in a controlled temperature room until use.
Testing was done based on ASTM method D4946.
Reported values are the average of three measurements per panel.

TABLE 37

Rhoplex HG-95P Grind formulation

| Component | Weight (g) |
|---|---|
| Water | 525.00 |
| NATROSOL ™ PLUS 330 (Mix 5 Minutes) | 6.30 |
| TAMOL ™ 165A | 28.56 |
| Triton ™ CF-10 | 8.40 |
| AMP-95 | 8.40 |
| BYK-024 | 10.50 |
| TRONOX ® 826S | 1477.98 |
| KATHON ™ LX 1.5% (Mix 15 Minutes) | 7.56 |
| Total: | 2072.70 |

TABLE 38

Rhoplex HG-95P Master Paint Formulation

| | Formulation A | Formulation B | Formulation C | Formulation D |
|---|---|---|---|---|
| Common Grind (g) | 493.50 | 493.50 | 493.50 | 493.50 |
| Rhoplex ™ HG-95P (g) | 486.80 | 486.80 | 486.80 | 486.80 |
| Coalescent | Texanol (25.81) | OE400 (30.79) | Citroflex 4 (28.97) | 0 |
| RFHA (g) | 0 | 0 | 0 | Ex 14 (43.01) |
| Acrysol ™ RM-2020 (g) (Mix 10 Minutes) | 20.00 | 20.00 | 20.00 | 20.00 |
| Water | 36.39 | 31.75 | 35.76 | 22.90 |
| Acrysol ™ RM-725 (g) (Final Mix 15 Minutes) | 1.20 | 1.20 | 1.20 | 1.20 |
| Total (g) | 1063.70 | 1064.03 | 1066.24 | 1067.41 |

TABLE 39

Rhoplex HG-95P Stability of wet paint formulations

| | Initial | | | 24 hr | | | | 1 Week | | | |
|---|---|---|---|---|---|---|---|---|---|---|---|
| Formulation | KU | pH | ICI (poise) | KU | Δ KU | ICI (poise) | pH* | KU | Δ KU | ICI (poise) | pH |
| A | 97.2 | 9.23 | 0.947 | 100.5 | 3.3 | 0.989 | 9.34 | 102.4 | 5.2 | 0.961 | 9.13 |
| B | 98.2 | 9.25 | 1.055 | 102.5 | 4.3 | 1.055 | 9.21 | 103.1 | 4.9 | 1.015 | 9.35 |
| C | 95.8 | 9.15 | 0.980 | 99.4 | 3.6 | 1.031 | 9.20 | 102.3 | 6.5 | 0.980 | 9.12 |
| D | 102.0 | 9.22 | 1.130 | 105.6 | 3.6 | 1.167 | 9.19 | 108.6 | 6.6 | 1.073 | 9.14 |

Stormer viscosities were measured with a KU-2 viscometer by Brookfield.
ICI viscosities were measured with a BYK CAP 2000+ viscometer.
*Measurement was taken at 72 hrs.

TABLE 40

Rhoplex HG-95P 28-day König hardness

| Formulation | Dry Time (1 Day) Hardness (sec) | Dry Time (7 Days) Hardness (sec) | Dry Time (14 Days) Hardness (sec) | Dry Time (21 Days) Hardness (sec) | Dry Time (28 Days) Hardness (sec) |
|---|---|---|---|---|---|
| A | 19 | 24 | 24 | 27 | 29 |
| B | 12 | 13 | 13 | 13 | 15 |
| C | 14 | 13 | 13 | 14 | 14 |
| D | 12 | 14 | 16 | 19 | 23 |

Drawdowns of the paints (3 mil wet on aluminum panels) were prepared for König testing.
All drawdowns were stored in a controlled temperature room until use.
König testing was done using BYK Gardner pendulum hardness tester.
Reported values are the average of three measurements per panel.

TABLE 41

Rhoplex HG-95P 14-day block resistance

| Formulation | Dry Time (1 Day) Block Resistance | Dry Time (7 Days) Block Resistance | Dry Time (14 Days) Block Resistance |
|---|---|---|---|
| A | 2 | 6 | 6 |
| B | 3 | 5 | 5 |
| C | 3 | 5 | 6 |
| D | 0 | 8 | 8 |

Drawdowns of the paints (6 mil wet on Form BH Leneta charts) were prepared for Block Resistance testing.
All drawdowns were stored in a controlled temperature room until use.
Testing was done based on ASTM method D4946.
Reported values are the average of three measurements per panel.

As shown in the Table 42, the level of reactive film-hardening additive phr required to lower the MFFT of a variety of latex resins is less than 7 phr at 4.0° C. and less than 8.5 phr at 2.0° C., exemplifying the film-forming efficiency of these materials.

TABLE 42

| | Latex | | | | | | | |
|---|---|---|---|---|---|---|---|---|
| | Rhoplex SG-30 | | Acronal 296 D | | Encor 379G | | Rhoplex HG-95P | |
| Ex # | 4.0° C. (phr) | 2.0° C. (phr) | 4.0° C. (phr) | 2.0° C. (phr) | 4.0° C. (phr) | 2.0° C. (phr) | 4.0° C. (phr) | 2.0° C. (phr) |
| Texanol | 4.62 | 5.46 | 6.78 | 7.80 | 2.91 | 4.13 | 9.38 | 10.39 |
| OE400 | 4.82 | 5.68 | 6.51 | 7.53 | 3.04 | 4.33 | 11.38 | 12.56 |
| Citroflex 4 | 4.47 | 5.25 | 5.63 | 6.49 | 3.14 | 4.51 | 10.70 | 11.81 |
| Example 14 | 6.0 | 7.09 | 6.95 | 8.04 | 3.43 | 4.88 | 16.31 | 18.0 |

Parts per hundred resin (PHR) of Texanol, OE400, Citroflex 4, or reactive film-hardening additive required to lower MFFT to 4° C. and 2° C. in Rhoplex SG-30, Acronal 296 D, Encor 379G, and Rhoplex HG-95P model coating systems.

Minimum Film-Forming Temperature (MFFT) Screening: ASTM 02354-10e

MFFT efficiency testing was based on ASTM D2354. The model instrument used was an MFFT-90 bar which allows samples to be tested from −10° C. to 90° C. For waterborne latexes, reaching a temperature of 2° C. is the primary goal. To reach that temperature, the MFFT bar was set to range from 0° C. to 18° C. This range is important since those Tg values for waterborne latexes somewhat correlate with their coinciding MFFT value. The higher the Tg value, the higher the MFFT value and vice versa. Neat commercial architectural latexes typically lie within this temperature range when testing for MFFT efficiency. Depending on the Tg of the material being tested, the range can be adjusted accordingly to determine the film's MFFT.

The ultimate goal for the final paint is to form a continuous film at a low temperature (4° C.). To achieve this, the MFFT of the neat latex material is first determined. If the neat latex material is above an MFFT of 2° C., we will add reactive film-hardening additives at different phr (% additive based on latex solids) levels to allow the latex to reach 2° C. To reach that temperature, a linear regression of the phr levels is performed. This allows one to determine the appropriate amount of reactive film-hardening additive to add to the final paint formulation. In addition to the determined phr values from the MFFT screening, one additional phr is added to the final paint formulation to account for pigmentation.

The invention has been described in detail with reference to the embodiments disclosed herein, but it will be understood that variations and modifications can be effected within the spirit and scope of the invention.

We claim:

1. A coating composition comprising:
   a. at least one latex compound; and
   b. at least one aromatic enol ether having Formula I:

$$A=\!\!\!=\!\!\!\diagdown_{O-R^{1a}} \qquad I$$

wherein:

A is $$\overset{R^2}{\underset{R^3}{\diagdown}}\!\!**,$$

wherein ** indicates the point of attachment; and $R^{1a}$ is $$\xi\!\!\diagdown\!\!\diagdown\!O\!\!\diagup\!\!\diagdown\!O\!\!\Big]_n\!\!R^4; \quad \text{or}$$

-continued

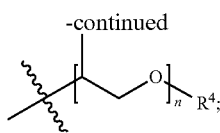

R² is a (C₅₋₁₀) aryl;
R³ is a (C₁₋₁₀)alkyl or a (C₅₋₁₀) aryl;
R⁴ is hydrogen, a (C₁₋₁₂) alkyl, a (C₂₋₁₂) alkenyl, or —C(O)R⁵;
R⁵ is a (C₁₋₁₂) alkyl unsubstituted or substituted by R⁶, a (C₂₋₁₂) alkenyl unsubstituted or substituted by R⁶, a (C₃₋₈) cycloalkyl, or a 5- to 9-membered aryl;
R⁶ is a (C₁₋₄) alkoxy, or an oxo; and
n is an integer from 1 to 15.

2. The aromatic enol ether of claim 1 wherein R² is phenyl, substituted phenyl, naphthyl, substituted napththyl, furanyl, or substituted furanyl.

3. The aromatic enol ether of claim 1 wherein R³ is methyl, ethyl, propyl, butyl, pentyl, hexyl, heptyl, octyl, nonyl, decyl, phenyl, substituted phenyl, naphthyl, substituted napththyl, furanyl, or substituted furanyl.

4. The aromatic enol ether of claim 1 wherein, n is an integer from 1 to 4.

5. The aromatic enol ether of claim 1 wherein R² is phenyl or substituted phenyl; R³ is methyl, ethyl, phenyl, or substituted phenyl and n is an integer from 1 to 4.

6. The aromatic enol ether of claim 1 wherein the composition has a volatile organic content of less than 50 wt % according to ASTM D6886.

7. The coating composition of claim 1 wherein said latex compound is an acrylic polymer, a vinyl acrylic polymer, a styrene butadiene polymer or a styrene acrylic latex polymer, or a mixture thereof.

8. The coating composition of claim 7 wherein said latex compound has a Tg in the range of from about −20° C. to about 100° C.

9. The coating composition of claim 1 wherein said latex compound is a styrene, methyl acrylate, methyl methacrylate, ethyl acrylate, ethyl methacrylate, butyl acrylate, butyl methacrylate, isobutyl acrylate, isobutyl methacrylate, ethylhexyl acrylate, 2-ethylhexyl methacrylate, 2-ethylhexyl acrylate, isoprene, octyl acrylate, octyl methacrylate, iso-octyl acrylate, iso-octyl methacrylate, acrylic acid, methacrylic acid, itaconic acid, crotonic acid, O-methyl styrene, vinyl naphthalene, vinyl toluene, chloromethyl styrene, hydroxyethyl (meth)acrylate, hydroxypropyl (meth)acrylate, acrylonitrile, glycidyl methacrylate, acetoacetoxyethyl methacrylate, acetoacetoxy ethyl acrylate, vinyl chloride, vinylidene chloride, vinyl acetate, butyl acrylamide, or ethyl acrylamide polymer or mixture thereof.

10. A coating composition comprising:
a. at least one latex compound; and
b. at least one aromatic enol ether having Formula II:

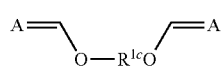

II wherein: each A is, independently,

and
wherein ** indicates the point of attachment;

R¹ᶜ is

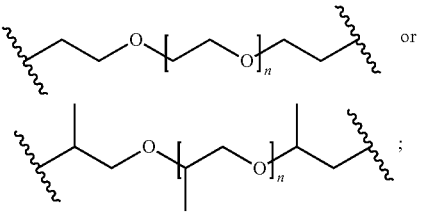

each R² is, independently, a (C₅₋₁₀) aryl;
each R³ is, independently a (C₁₋₁₀) alkyl or a (C₅₋₁₀) aryl; and
n is an integer from 1 to 15;
or mixtures thereof.

11. The aromatic enol ether of claim 7 wherein R² is phenyl, substituted phenyl, naphthyl, substituted napththyl, furanyl, or substituted furanyl.

12. The aromatic enol ether of claim 7 wherein R³ is methyl, ethyl, propyl, butyl, pentyl, heptyl, hexyl, heptyl, octyl, nonyl, decyl, phenyl, substituted phenyl, naphthyl, substituted napththyl, furanyl, or substituted furanyl.

13. The aromatic enol ether of claim 7 wherein R² is phenyl or substituted phenyl, R³ is methyl, ethyl, phenyl, or substituted phenyl and n is an integer from 1 to 3.

14. The aromatic enol ether of claim 7 wherein said composition has a volatile organic content of less than 50 wt % according to ASTM D6886.

15. The coating composition of claim 7 wherein said latex compound is an acrylic polymer, a vinyl acrylic polymer, a styrene butadiene polymer or a styrene acrylic latex polymer, or a mixture thereof.

16. The coating composition of claim 7 wherein said latex compound has a Tg in the range of from about −20° C. to about 100° C.

17. The coating composition of claim 7 wherein said latex compound is a styrene, methyl acrylate, methyl methacrylate, ethyl acrylate, ethyl methacrylate, butyl acrylate, butyl methacrylate, isobutyl acrylate, isobutyl methacrylate, ethylhexyl acrylate, 2-ethylhexyl methacrylate, 2-ethylhexyl acrylate, isoprene, octyl acrylate, octyl methacrylate, iso-octyl acrylate, iso-octyl methacrylate, acrylic acid, methacrylic acid, itaconic acid, crotonic acid, O-methyl styrene, vinyl naphthalene, vinyl toluene, chloromethyl styrene, hydroxyethyl (meth)acrylate, hydroxypropyl (meth)acrylate, acrylonitrile, glycidyl methacrylate, acetoacetoxyethyl methacrylate, acetoacetoxy ethyl acrylate, vinyl chloride, vinylidene chloride, vinyl acetate, butyl acrylamide, ethyl acrylamide, or 2-hydroxyethyl methacrylate phosphate polymer or mixture thereof.

18. A coating composition comprising:
a. at least one latex compound; and
b. at least one aromatic enol ether selected from the group consisting of:

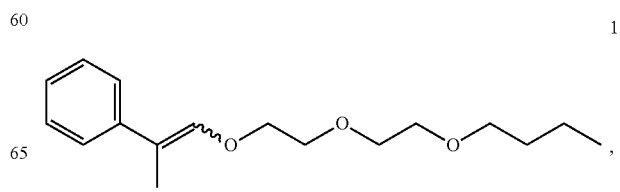

1

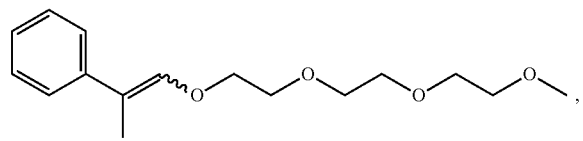
2
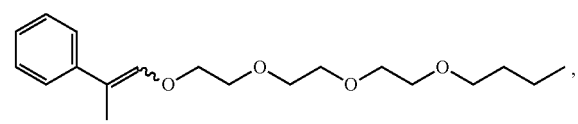
3
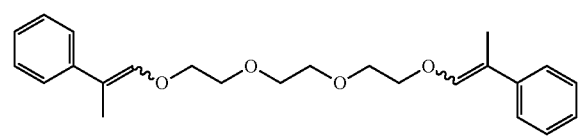
4a
+
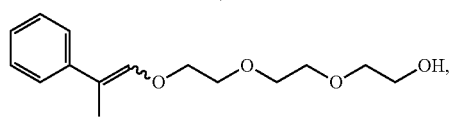
4b
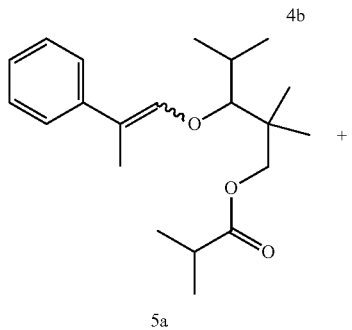
5a
+
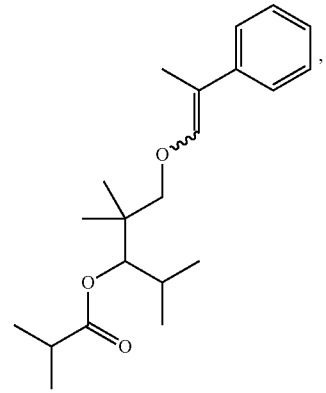
5b
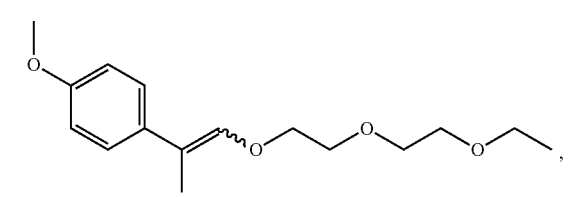
6
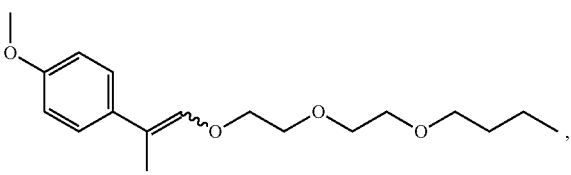
7
8
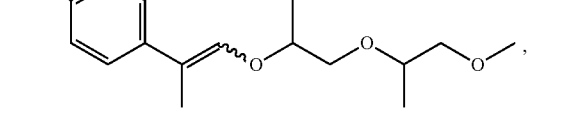
9

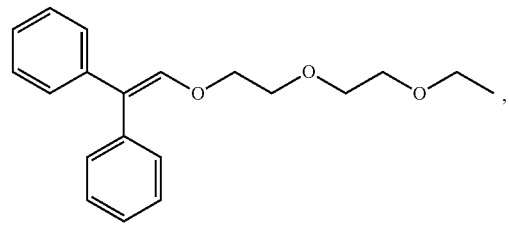
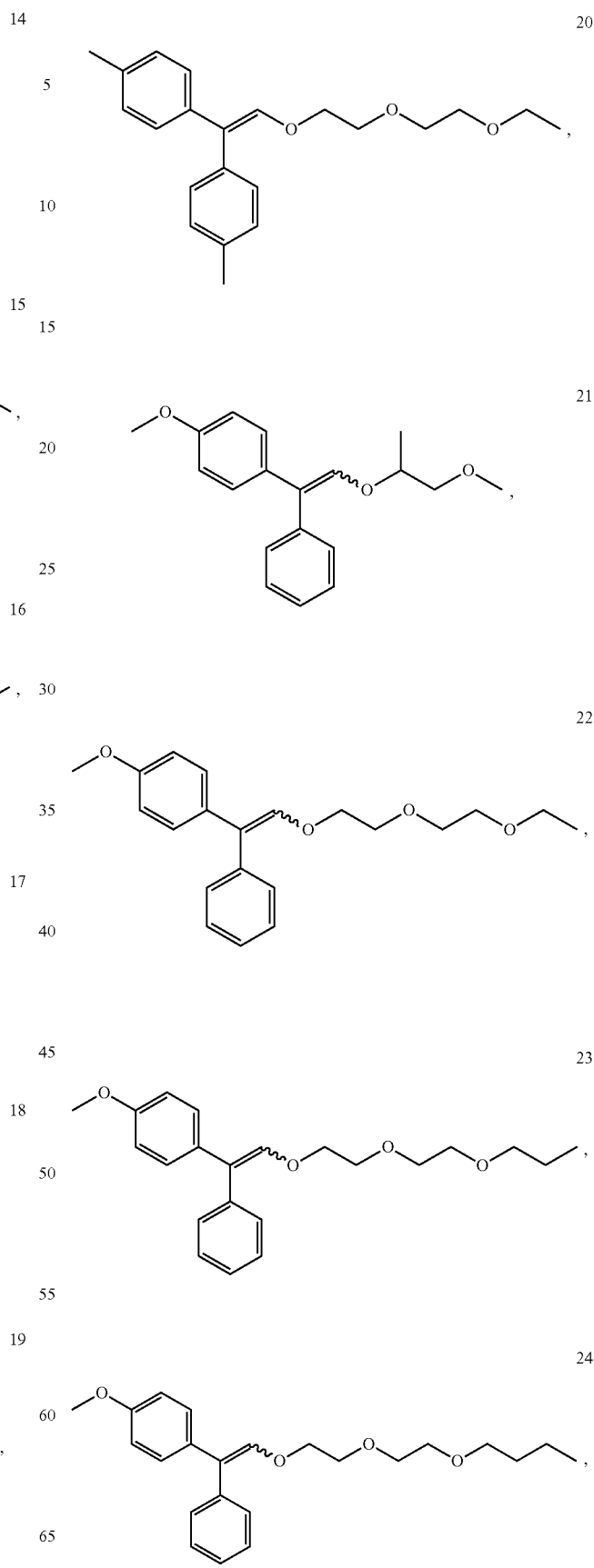

-continued

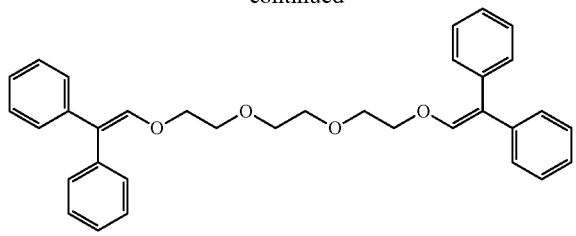

25a

+

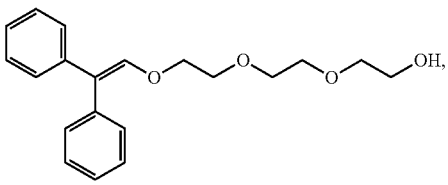

25b

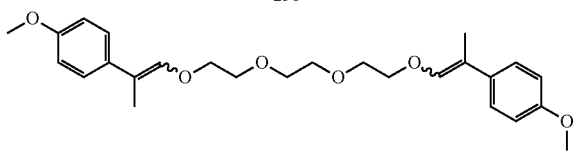

26a

+

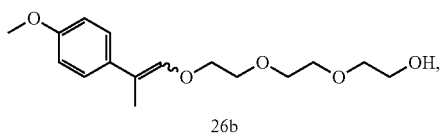

26b and isomers thereof.

19. A method of improving the performance properties of a cured paint without contributing to the volatile organic content of the paint formula comprising adding an aromatic enol ether to said paint, wherein said aromatic enol ether has a Formula I:

$$A\!=\!\!\!\diagdown_{O-R^{1a}} \quad \text{I}$$

wherein:
A is

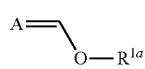

wherein ** indicates the point of attachment; and $R^{1a}$ is

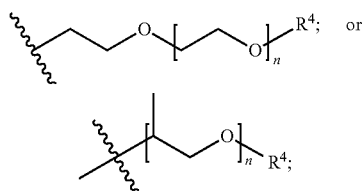

$R^2$ is a $(C_{5-10})$ aryl;
$R^3$ is a $(C_{1-10})$ alkyl or a $(C_{5-10})$ aryl;
$R^4$ is hydrogen, a $(C_{1-12})$ alkyl, a $(C_{2-12})$ alkenyl, or —C(O)R$^5$;
$R^5$ is a $(C_{1-12})$ alkyl unsubstituted or substituted by R$^6$, a $(C_{2-12})$ alkenyl unsubstituted or substituted by R$^6$, a $(C_{3-8})$ cycloalkyl, or a 5- to 9-membered aryl;
$R^6$ is a $(C_{1-4})$ alkoxy, or an oxo; and
n is an integer from 1 to 15.

20. A method of improving the performance properties of a cured paint without contributing to the volatile organic content of the paint formula comprising adding an aromatic enol ether to said paint, wherein said aromatic enol ether has a Formula II:

$$A\!=\!\!\!\diagdown_{O-R^{1c}O}\!\!\!\diagup\!=\!A \quad \text{II}$$

wherein:
each A is, independently,

wherein ** indicates the point of attachment, and;
$R^{1c}$ is

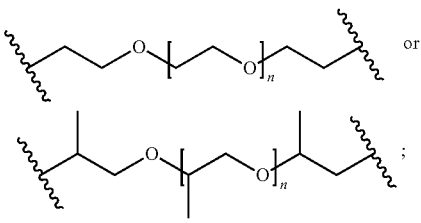

each $R^2$ is, independently, a $(C_{5-10})$aryl;
each $R^3$ is, independently a $(C_{1-10})$alkyl or a $(C_{5-10})$aryl; and
n is an integer from 1 to 15.

* * * * *